(12) United States Patent
Kavidayal et al.

(10) Patent No.: US 10,672,174 B2
(45) Date of Patent: Jun. 2, 2020

(54) DETERMINING IMAGE HANDLE LOCATIONS

(71) Applicant: Adobe Inc., San Jose, CA (US)

(72) Inventors: Mridul Kavidayal, Noida (IN); Vineet Batra, Pitam Pura (IN); Matthew David Fisher, Palo Alto, CA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/022,387

(22) Filed: Jun. 28, 2018

(65) Prior Publication Data

US 2020/0005511 A1 Jan. 2, 2020

(51) Int. Cl.
*G06K 9/62* (2006.01)
*G06N 3/08* (2006.01)
*G06T 13/80* (2011.01)
*G06T 3/00* (2006.01)

(52) U.S. Cl.
CPC ............ *G06T 13/80* (2013.01); *G06K 9/6218* (2013.01); *G06K 9/6256* (2013.01); *G06N 3/08* (2013.01); *G06T 3/0093* (2013.01); *G06T 2200/24* (2013.01)

(58) Field of Classification Search
CPC ..... G06T 13/80; G06T 3/0093; G06K 9/6218; G06K 9/6256; G06N 3/08
See application file for complete search history.

(56) References Cited

U.S. PATENT DOCUMENTS

| 10,482,607 | B1 | 11/2019 | Walters et al. |
| 2002/0003897 | A1 | 1/2002 | Tanaka |
| 2005/0240886 | A1 | 10/2005 | Bonges et al. |

(Continued)

FOREIGN PATENT DOCUMENTS

| CN | 106156700 | 11/2016 |
| EP | 3480786 | 5/2019 |
| GB | 2571307 | 8/2019 |

OTHER PUBLICATIONS

"Buy Adobe Illustrator CC | Vector graphic design software", Retrieved at: https://www.adobe.com/in/products/illustrator.html—on Apr. 26, 2018, 8 pages.

(Continued)

*Primary Examiner* — Sing-Wai Wu
(74) *Attorney, Agent, or Firm* — SBMC

(57) ABSTRACT

Systems and techniques are described for determining image handle locations. An image is provided to a neural network as input, and the neural network translates the input image to an output image that includes clusters of pixels against a background that have intensities greater than an intensity of the background and that indicate candidate handle locations. Intensities of clusters of pixels in an output image are compared to a threshold intensity level to determine a set of the clusters of pixels satisfying an intensity constraint. The threshold intensity level can be user-selectable, so that a user can control a density of handles. A handle location for each cluster of the set of clusters is determined from a centroid of each cluster. Handle locations include a coordinate for the handle location and an attribute classifying a degree of freedom for a handle at the handle location.

20 Claims, 12 Drawing Sheets

(56) References Cited

U.S. PATENT DOCUMENTS

| | | | |
|---|---|---|---|
| 2006/0133699 A1* | 6/2006 | Widrow | G06K 9/62 |
| | | | 382/305 |
| 2010/0197400 A1 | 8/2010 | Geiss | |
| 2011/0050864 A1* | 3/2011 | Bond | G06T 7/579 |
| | | | 348/51 |
| 2013/0044945 A1 | 2/2013 | Nykyforov | |
| 2015/0055875 A1 | 2/2015 | Kawaguchi et al. | |
| 2017/0098326 A1* | 4/2017 | Wampler | G06T 3/0006 |
| 2018/0075581 A1 | 3/2018 | Shi et al. | |
| 2018/0150947 A1 | 5/2018 | Lu et al. | |
| 2018/0189951 A1* | 7/2018 | Liston | G06T 11/00 |
| 2018/0218198 A1 | 8/2018 | Hushchyn et al. | |
| 2018/0293501 A1 | 10/2018 | Ambati et al. | |
| 2019/0080456 A1 | 3/2019 | Song et al. | |
| 2019/0139191 A1 | 5/2019 | Liu et al. | |
| 2019/0261717 A1 | 8/2019 | Schultz et al. | |
| 2019/0355154 A1 | 11/2019 | Batra et al. | |
| 2019/0385302 A1 | 12/2019 | Ngo Dinh et al. | |
| 2019/0392196 A1 | 12/2019 | Sagonas et al. | |
| 2020/0013205 A1 | 1/2020 | Kavidayal et al. | |

OTHER PUBLICATIONS

"Vector Magic: Convert JPG, PNG images to SVG, EPS, AI vectors", Retrieved at: https://vectormagic.com/—on Apr. 26, 2018, 10 pages.

Arbelaez,"Contour Detection and Hierarchical Image Segmentation", Retrieved from <http://www.cs.berkeley.edu/~arbelaez/publications/amfm_pami2011.pdf> on Nov. 28, 2012, May 2011, 20 pages.

Au,"Skeleton Extraction by Mesh Contraction", ACM Trans. Graph., 27(3):44:1{44:10, Aug. 2008, 10 pages.

Batra,"Colorization of Vector Images", U.S. Appl. No. 15/981,496, filed May 17, 2018, 38 pages.

Gucluturk,"Convolutional Sketch Inversion", Jun. 9, 2016, 15 pages.

Gulrajani,"Improved Training of Wasserstein GANs", Dec. 25, 2017, 20 pages.

He,"Deep Residual Learning for Image Recognition", Dec. 10, 2015, 12 pages.

Isola,"Image-to-Image Translation with Conditional Adversarial Networks", Nov. 22, 2017, 17 pages.

Johnson,"Perceptual Losses for Real-Time Style Transfer and Super-Resolution.", Mar. 27, 2016, 18 pages.

Pathak,"Context Encoders: Feature Learning by Inpainting", CVPR 2016, Nov. 21, 2016, 12 pages.

Ronneberger,"U-Net: Convolutional Networks for Biomedical Image Segmentation", May 18, 2015, 8 pages.

Sangkloy,"Scribbler: Controlling Deep Image Synthesis with Sketch and Color", Dec. 5, 2016, 13 pages.

Wilber,"BAM! The Behance Artistic Media Dataset for Recognition Beyond Photography", Computer Vision and Pattern Recognition (cs.CV), Apr. 27, 2017, 10 pages.

Wu,"Deep Convolutional Neural Network with Independent Softmax for Large Scale Face Recognition", In Proceedings of the 2016 ACM on Multimedia Conference, MM '16, Oct. 1, 2016, 5 pages.

Zhang,"Colorful Image Colorization", Oct. 5, 2016, 29 pages.

"Generative adversarial network", downloaded from https://en.wikipedia.org/wiki/Generative_adversarial_network—on Apr. 25, 2018, 3 pages.

Asente,"Dynamic Planar Map Illustration", ACM Transactions on Graphics (TOG)—Proceedings of ACM SIGGRAPH 2007; vol. 26 Issue 3, Jul. 2007., Jul. 2007, 10 pages.

"Pre-Interview First Office Action", U.S. Appl. No. 16/028,075, dated Dec. 13, 2019, 5 pages.

"Combined Search and Examination Report", GB Application No. 1905846.0, dated Sep. 30, 2019, 9 pages.

"Pre-Interview First Office Action", U.S. Appl. No. 15/981,496, dated Feb. 4, 2020, 3 pages.

"First Action Interview Office Action", U.S. Appl. No. 16/028,075, dated Jan. 23, 2020, 4 pages.

"Notice of Allowance", U.S. Appl. No. 16/028,075, dated Feb. 12, 2020, 7 pages.

* cited by examiner

302

304

306

308

Image Module 244

Neural Network Module 248

DETERMINING IMAGE HANDLE LOCATIONS

BACKGROUND

Images are often used to create animation sequences, such as by deforming an image to generate another image in an animation sequence. For images represented by vector graphics, such as curves, splines (e.g., piecewise polynomials), and the like, deforming the image involves editing basis points of curves of the vector graphics. These editing techniques are extremely time consuming, especially for images consisting of a large number of curves, and require a high level of expertise on behalf of the graphic designer.

Consequently, editing techniques (e.g., animation workflows) have been recently developed that do not deform an image by direct manipulation of a curve representation of the image, but instead deform an image based on handles affixed to an image. For instance, a user may select and drag a handle on an image to deform the image. As an example, FIG. 1 illustrates example images 100 in accordance with one or more aspects of the disclosure. Images 100 includes image 102 and image 104 that both include an object, e.g., artwork. In the example in FIG. 1, image 104 has been generated by deforming the artwork of image 102. For instance, image 102 depicts a person (e.g., the artwork of image 102) having a plurality of handles inserted on the person, including handle 106-1, handle 106-2, handle 106-3, handle 106-4, handle 106-5, and handle 106-6 (collectively handles 106).

Image 104 is generated by selecting handle 106-1 on image 102 and dragging handle 106-1 towards the right (e.g., with a mouse). This dragging motion is indicated by arrow 108. Since handle 106-1 is located on the person's head in image 102, the person in image 104 is deformed according to the movement of handle 106-1 indicated by arrow 108. In this case, the person in image 104 leans to one side with a tilted head based on the movement of handle 106-1 indicated by arrow 108. To further illustrate the deformation caused by moving handle 106-1 in image 102 to generate image 104, image 102 includes indicator 110 and image 104 includes indicator 112. In image 110, indicator 110 is horizontal, while in image 104, based on the movement of handle 106-1 illustrated by arrow 108, indicator 112 in image 104 is moved from horizontal and depicts an angle of tilt of the person's head in image 104 with respect to horizontal.

The locations of handles on an image can have significant impact on the quality of images generated by deforming the image according to the handles on the image. For instance, an animation sequence generated from poorly-placed handles on an image usually looks unrealistic. Unfortunately, placing handles at locations on an image to generate a realistic animation sequence from the image usually requires experience levels beyond all but highly-trained experts. As a result, users often repeat steps in an animation process, such as by trying different handle locations, until an acceptable animation sequence is obtained. This process is both frustrating for the user and time-consuming for the user, and often produces poor animation results despite significant user effort.

SUMMARY

Techniques and systems are described to determine handle locations on an image. An output image is generated from a representation of an input image, such as a rasterized version of an input image or a mesh of an object in an input image (e.g., a mesh of primitives, such as a triangle mesh). The output image includes clusters of pixels against a background, such as a uniform black background. The clusters of pixels have intensities greater than an intensity of the background and indicate candidate handle locations. The output image is generated with a neural network that is trained with input images having expert-specified handle locations and output images generated by convolving Gaussian filters with white patches at the expert-specified handle locations on a black background. In one example, the neural network is a generative adversarial network. A set of the clusters of pixels having respective intensity levels above a threshold intensity level is determined for the output image, and a respective handle location for each cluster of the set of clusters is found from the centroid of each cluster. The threshold intensity level can be user-selectable, and used to control the number of handle locations generated for an image. Handle locations can include a coordinate for the respective handle location and an attribute classifying a degree of freedom for a handle at the respective handle location, such as rigid, flexible, and anchor. Furthermore, a user-selection may indicate a desired density of handle locations to be determined for an object in an image, such as coarse, medium, and fine, and a neural network may be selected from a plurality of available neural networks based on the desired density, such as neural networks that have been trained with different densities of handle locations.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
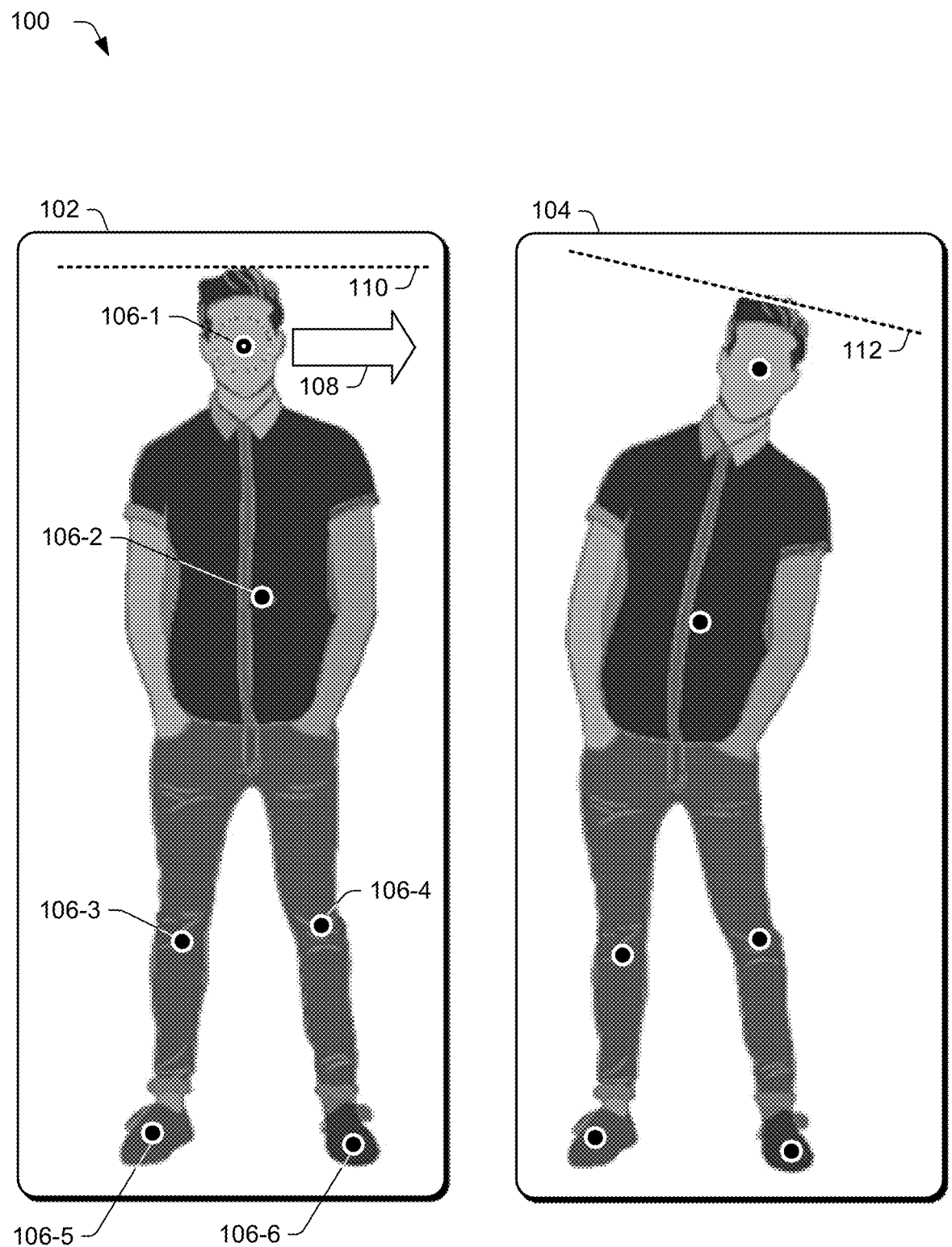
FIG. 1 illustrates example images in accordance with one or more aspects of the disclosure.

Creating animation sequences often relies on deforming an object in an image such as artwork of an image. To deform an object in an image, some designers manually edit basis points of vector graphics constructs (e.g., curves) representing artwork. Additionally or alternatively, designers may manually assign control points such as handle locations to artwork (e.g., an object in an image), and deform the artwork by translating or rotating a handle at an assigned handle location. However, these methods are slow and often require multiple iterations of editing tasks by the user with no guarantee that a realistic animation sequence is produced. For instance, a user may place a handle at a location on artwork of an image and deform the artwork according to the handle, revert the deformation because the user is not satisfied, move the handle, and again deform the artwork. The user may repeat these steps multiple times to generate an animation sequence. Hence, these methods are both frustrating and time-consuming for the user, and often produce poor animation results despite significant user effort.

Accordingly, this disclosure describes systems and techniques for determining image handle locations from a representation of an input image, such as a rasterized version of an input image, a mesh of primitives for an input image (e.g., a triangle mesh of artwork of an image), and the like. A representation of an input image is translated to an output image. In one example, a rasterized image in greyscale is provided to a neural network as an input image, and the neural network produces an output image based on the rasterized image. Additionally or alternatively, a mesh for an image can be provided to a neural network as input, and the neural network can produce an output image based on the mesh.

An output image generated by translating an input image includes clusters of pixels against a background, such as a uniform background (e.g., black). The clusters of pixels have intensities greater than an intensity of the background and indicate candidate handle locations. For instance, a handle location may be determined within a cluster of pixels. Intensities of clusters of pixels in an output image are compared to a threshold intensity level to determine a set of the clusters of pixels satisfying an intensity constraint. In one example, an intensity constraint includes determining a set of the clusters of pixels having respective intensity levels above the threshold intensity level. For instance, a respective intensity level for each cluster of pixels in an output image may be determined from a respective average intensity for each cluster of pixels, and compared to a threshold intensity level to determine whether a cluster of pixels is included in a set of the clusters of pixels satisfying an intensity constraint.

A handle location for each cluster of the set of clusters is determined. In one example, a handle location for each cluster of the set of clusters is found from a centroid (e.g., a center of mass) of each cluster. Handle locations include a coordinate for a respective handle location, such as an x-y coordinate that identifies a location on an object in an image (e.g., a rasterized image). In one example, handle locations include an attribute classifying a degree of freedom for a handle at a respective handle location. For instance, a handle location for a person's shoulder may include an attribute indicating the shoulder is more rigid, and less flexible, than an attribute of a handle location for a person's hand. A handle location may include an attribute identifying a handle as an anchor. A handle identified as an anchor may remain at a fixed position so that the artwork can be deformed by rotating the artwork about the position, rather than moving the anchor from the position. For instance, a handle location for a person's foot may be designated as an anchor so that the person's foot remains fixed while the artwork of the person is deformed.

Furthermore, a user interface is generated that exposes user-selectable options to control handle locations determined for images. In one example, a user interface exposes a control (e.g., a slider control in the user interface) to adjust a threshold intensity level used to determine a set of clusters in an output image satisfying an intensity constraint. By varying the threshold intensity level, the number of clusters in the set of clusters that have respective intensities satisfying the intensity constraint (e.g., greater than the threshold intensity level) is varied. Accordingly, a user may control the number of handles and handle locations determined for an object in an image by setting a threshold intensity.

Additionally or alternatively, a user interface can include options for a desired density of handles and handle locations, such as menu options for coarse, medium, and fine densities of handles. A user-selection may indicate a desired density of handle locations to be determined for an object in an image, and a neural network may be selected based on the user-selection from a plurality of available neural networks, such as neural networks that have been trained with different densities of handle locations (e.g., training images containing different densities of handle locations).

A neural network that translates a representation of an input image to generate an output image including clusters of pixels indicating candidate handle locations can be any suitable neural network. In one example, a neural network is trained with input images having expert-specified handle locations (e.g., locations specified by trained experts in placing handles on an object of an image, such as trained graphic designers) and output images generated by convolving Gaussian filters with white patches at the expert-specified handle locations on a black background. Different training sets representing different densities of handle locations can be used to train different neural networks that are user-selectable via a user interface, such as based on a user-selection indicating a desired density of handle locations. A neural network can be trained with a loss function including a pixel loss term, an adversarial loss term, and a perceptual loss term. In one example, a neural network that generates an output image including clusters of pixels from a representation of an input image is a conditional generative adversarial network that includes a generator trained to produce output images that cannot be distinguished from "real" images by an adversarially trained discriminator that is trained to detect the generator's "fake" images.

Hence, handle locations for an image are determined quickly and reliably based on a neural network that is trained with handle locations that have been determined for images by experts. Accordingly, even novice users can generate handle locations for artwork of an image at a desired density of handles that can be used to deform the artwork and produce a realistic animation sequence, without user frustration and without wasted efforts caused by repeating steps of the animation process until a desired result is achieved.

Furthermore, the inventors have determined that using skeletal extraction techniques, in which a surface flow degenerates to a skeleton approximating a medial axis, may be used to determine image handle locations, such as by placing handles on the medial axis (e.g., at joints of the medial axis).

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 2:
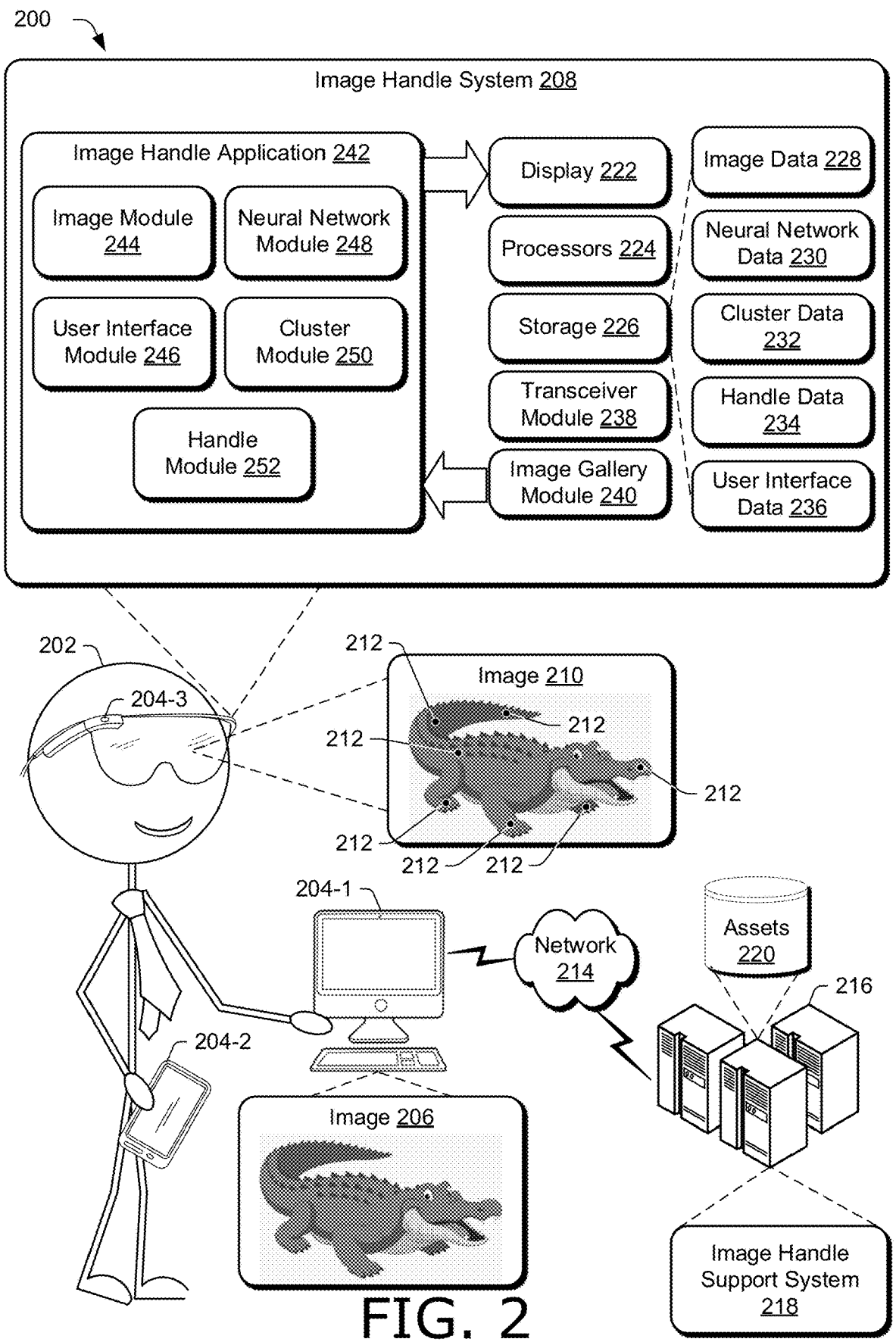
FIG. 2 illustrates a digital medium environment in an example implementation that is operable to employ techniques described herein.

FIG. 2 is an illustration of a digital medium environment 200 in an example implementation that is operable to employ techniques described herein. As used herein, the term "digital medium environment" refers to the various computing devices and resources that can be utilized to implement the techniques described herein. The illustrated digital medium environment 200 includes a user 202 having at least one computing device. In the example in FIG. 2, user 202 is illustrated as having three computing devices, computing devices 204-1, 204-2, and 204-3 (collectively 204). For instance, computing device 204-1 depicts a desktop computer, computing device 204-2 depicts a tablet or smart phone, and computing device 204-3 depicts a pair of eye glasses (e.g., smart goggles). Computing devices 204 are example computing devices, and any suitable computing device is contemplated, such as a mobile phone, tablet, laptop computer, desktop computer, gaming device, goggles, glasses, camera, digital assistant, echo device, image editor, non-linear editor, digital audio workstation, copier, scanner, and the like. Furthermore, discussion of one of computing devices 204 is not limited to that computing device, but generally applies to each of the computing devices 204. Moreover, computing devices 204 may range from full resource devices with substantial memory and processor resources (e.g., personal computers, game consoles) to a low-resource device with limited memory or processing resources (e.g., mobile devices).

In one example, computing devices 204 include a wearable device that is designed to be worn by, attached to, carried by, or otherwise transported by user 202. Examples of wearable devices include glasses, a smart band or watch, and a pod device such as clip-on fitness device, media player, or tracker. Other examples of a wearable device include but are not limited to a badge, a key fob, an access card, and a ring, an article of clothing, a glove, and a bracelet.

Various types of input devices and input instrumentalities can be used to provide input to computing devices 204. For example, computing devices 204 can recognize input as being a mouse input, stylus input, touch input, input provided through a natural user interface, and the like. Thus, computing devices 204 can recognize multiple types of gestures including touch gestures and gestures provided through a natural user interface. In one example, computing devices 204 include speech recognition, identification, and synthesis functionalities, microphones, and speakers that allow computing devices 204 to communicate with user 202 in a conversation, e.g., a user conversation.

Figure 12:
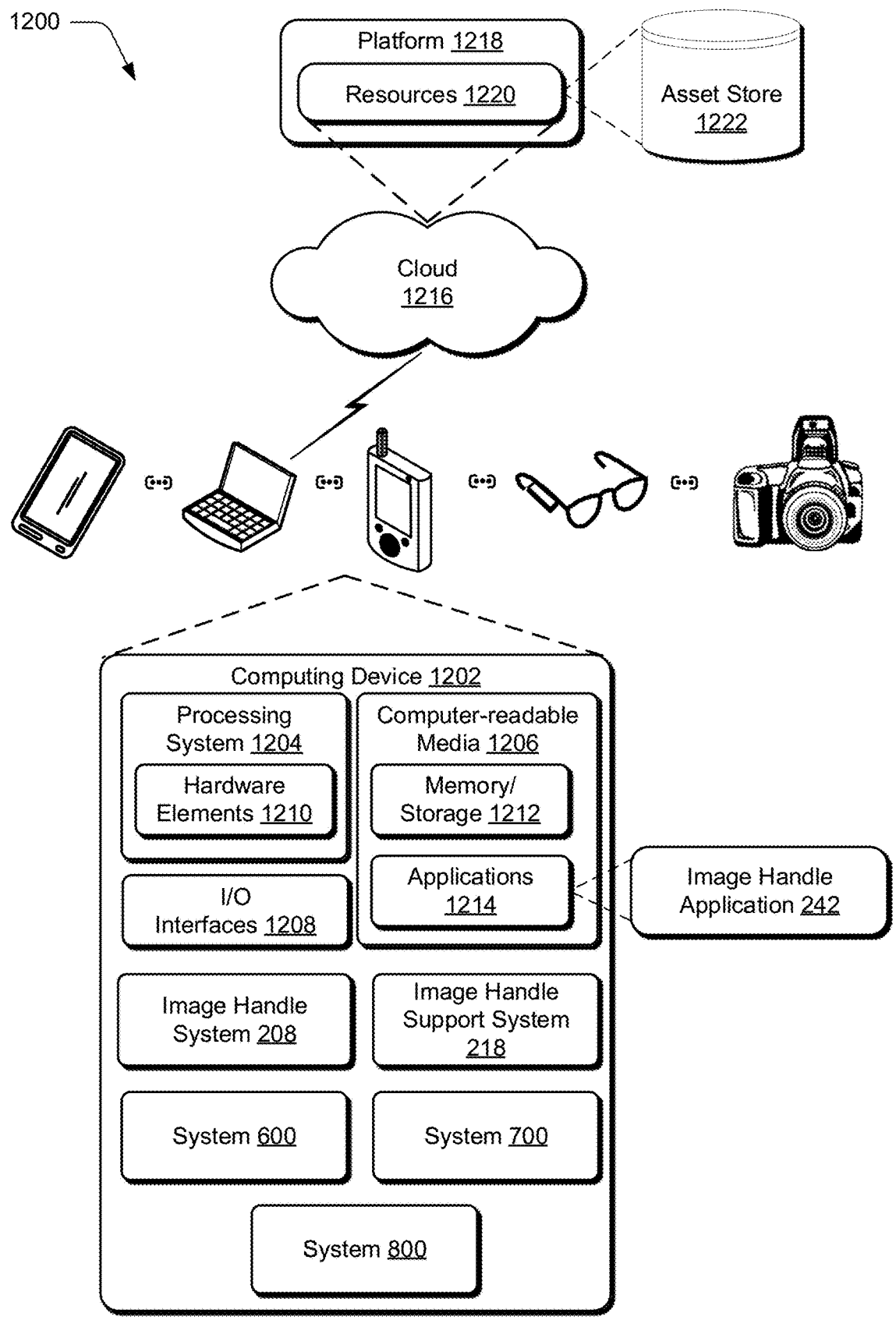
FIG. 12 illustrates an example system including various components of an example device that can be implemented as any type of computing device as described and/or utilized with reference to FIGS. 1-11 to implement aspects of the techniques described herein.

Furthermore, computing devices 204 may be representative of one or a plurality of different devices, such as one or more devices connected to a network that perform operations "over the cloud" as further described in relation to FIG. 12. In one example, computing devices 204 are communicatively coupled to each other, such as with a low power wireless communication standard (e.g., a Bluetooth® protocol). For instance, computing device 204-1 can communicate wirelessly with computing device 204-2 and computing device 204-3. Hence, an asset (e.g., image, video, text, drawing, document, file, and the like) generated, processed (e.g., edited), or stored on one device (e.g., computing device 204-1) can be communicated to, and displayed and processed on another device (e.g., computing device 204-3).

In the example illustrated in FIG. 2, computing device 204-1 obtains image 206. Image 206 is an example of an asset, and can be obtained in any suitable way, such as from another computing device, from file storage on computing device 204-1, and the like. In one example, image 206 includes a rasterized image. Additionally or alternatively, image 206 can be represented by curves, such as n-th order polynomial splines, (e.g., n=1, 2, 3, or 4), Bezier segments, combinations thereof, and the like. In one example, image 206 is represented by a mesh of primitives (e.g., a triangle mesh of artwork of an image), as described in U.S. patent application Ser. No. 15/861,908 entitled Generating A Triangle Mesh For An Image Represented By Curves to Batra et al., filed Jan. 4, 2018, the disclosure of which is incorporated herein by reference in its entirety.

Image 206 in the example illustrated in FIG. 2 includes an object, e.g., artwork depicting an alligator. User 202 provides image 206 to image handle system 208, which generates image 210. Image 210 denotes various handles 212 at locations on the artwork depicting the alligator. For instance, image handle system 208 generates handle locations for image 206, and inserts handles 212 on the artwork of the alligator at the handle locations to produce image 210. Handles 212 can be denoted by any suitable indicator. In the example in FIG. 2, handles 212 are denoted with black circles enclosed by white rings. In one example, handles 212 are represented by designators that illustrate an attribute of a respective handle, such as circles for flexible handles, squares for rigid handles, and triangles for handles that are anchor points. Accordingly, image 210 can be deformed, such as by moving one or more of handles 212, to generate an animation sequence (e.g., depicting the alligator walking).

Computing devices 204 are also coupled to network 214. Network 214 communicatively couples computing devices 204 with server 216 (for clarity, only computing device 204-1 is illustrated in FIG. 2 as coupled to network 214, though computing devices 204-2 and 204-3 can also be coupled to server 216 via network 214). Network 214 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 216 may include one or more servers or service providers that provide services and/or resources to computing devices 204. Generally, resources provided by server 216 may be licensed, purchased, or may be made freely available, (e.g., without authentication, license, or account-based access). The resources can include any suitable combination of services and content, such as made available over network 214 by one or more providers. Some examples of services include, but are not limited to, an on-line shopping service, a photo editing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), maps, computer code, and the like. Assets may be made available to image handle system 208, image handle support system 218, or combinations thereof, and stored at assets 220 of server 216. Hence, image 206 can include any suitable asset stored at assets 220 of server 216.

Furthermore, server 216 includes image handle support system 218 configurable to receive signals from computing devices 204, process the received signals, and send the processed signals to computing devices 204 to support determining image handle locations. For instance, computing device 204-1 may obtain any suitable representation of an image, such as a rasterized image, vector-graphics curve representation, triangle mesh and the like, and communicate any suitable data (e.g., a rasterized version of image 206, user-selections, such as indicating a desired density of handles, a threshold intensity level, and the like) to server 216. Server 216, using image handle support system 218, may calculate handle locations and attributes of handles from the data received from computing device 204-1. Server 216 may then provide handle locations and attributes of handles back to computing device 204-1, which can display designators for the handles based on the attributes on an image, such as image 210, at locations corresponding to the handle locations. Accordingly, image handle support system 218 of server 216 can include a copy of image handle system 208, including image handle application 242 (discussed below in more detail).

Computing devices 204 include image handle system 208 to determine image handle locations and attributes of the handles. For clarity, computing device 204-3 is illustrated in FIG. 2 as including image handle system 208, though computing device 204-1 and computing device 204-2 also include copies of image handle system 208 (not shown).

Image handle system 208 includes a display 222. Display 222 can expose any suitable data used by or associated with image handle system 208. In one example, display 222 displays a user interface for exposing assets, images (e.g., rasterized images, images represented by vector graphics, output images generated by a neural network, and the like), triangle meshes, handles (e.g., designators of handles that distinguish between attributes of the handles that describe a degree of freedom of the handle, such as rigid, flexible, and the like), animation sequences, user-selectable control options, such as a mechanism to select a threshold intensity level, e.g., a slider control, menu options for desired densities of handles and handle locations, such as coarse, medium, and fine, combinations thereof, and the like. Display 222 can expose a user interface configurable to edit an image, such as by deforming a mesh.

Display 222 can include any suitable type of display, such as a touchscreen, liquid crystal display, plasma display, head-mounted display, projector and screen, and the like. A touchscreen of display 222 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like.

Image handle system 208 also includes processors 224. Hence, image handle system 208 may be implemented at least partially by executing instructions stored on storage 226 on processors 224. For instance, processors 224 may execute portions of image handle application 242.

Storage 226 can be any suitable type of storage accessible by or contained in image handle system 208. Storage 226 stores and provides access to and from memory included in storage 226 for any suitable type of data. For instance, storage 226 includes image data 228, such as a rasterized image (e.g., a bitmap, pixel data, or combinations thereof), curves of an image, graphics of the image generated according to the curves (e.g., adding color), metadata of an image, such as data governing usage rights of the image, a source location of the image, date an image was generated, etc., a thumbnail version of an image, a copy of an image, a mesh representation of an image, an output image from a neural network including clusters of pixels against a background to indicate candidate handle locations, an identification number of an image, such as a number for an image in an animation sequence, a number to locate an image in a database of images, and the like.

Storage 226 also includes neural network data 230, such as training data (e.g., pairs of input images and output images, alpha masks, etc.), neural networks (e.g., a plurality of neural networks that have been trained with training sets corresponding to different densities of handles and handle locations), indicators of a loss of a neural network (e.g., a loss measurement of a neural network over a training set, a loss measurement for an output image generated by a neural network, and the like), weighting parameters of a loss function (e.g., respective weights of a pixel loss term, an adversarial loss term, and a perceptual loss term), encoder and decoder parameters (e.g., filter sizes and numbers of filters), normalization parameters, activation functions, indicators of skip connections, and the like.

Storage 226 also includes cluster data 232, such as data regarding clusters of pixels in an output image generated by a neural network, including numbers of clusters, locations of clusters (e.g., regions, quadrants and the like of an output image that include clusters), respective intensities of clusters (e.g., measurements of an average intensity of a cluster), threshold intensity levels, sets of clusters of pixels satisfying an intensity constraint (e.g., having respective intensity levels greater than a threshold intensity level), user preferences of threshold intensity levels, combinations thereof, and the like Storage 226 also includes handle data 234, such as data regarding handles of an object (e.g., artwork) of an image, including a number of handles, handle locations (e.g., coordinates on an image or an object that locate the handle on the object, such as Cartesian coordinates or polar coordinates, a vertice number on a mesh on which a handle is located, combinations thereof, and the like), attributes of handles (e.g., attributes describing degrees of freedom of handles at handle locations, such as rigid to indicate partial, limited movement, flexible to indicate full movement, and anchor to indicate no movement, a rotation attribute to indicate that artwork may be deformed by rotating the artwork about a handle designated with a rotation attribute, and the like), an indicator of whether a handle was manually placed (e.g., by a user) or automatically placed (e.g., by image handle system 208), combinations thereof, and the like.

Storage 226 also includes user interface data 236, including data associated with user interfaces, such as user preferences (e.g., font size and style, locations and sizes of panels presented in a user interface, indicators of neural networks used by, or preferred by users, and the like), data of users operating a user interface (e.g., user histories of edits including user-selections of threshold intensity levels, densities of handles, and the like, user interface configurations (e.g., different layouts, language options, etc.), controls and adjusters (e.g., sliders, lists of user gestures to control a user interface, etc.), options for handle indicators, such as circles, rings, squares, triangles, colors, and the like used to indicate a handle, attribute of a handle, or combinations thereof, user interface version numbers, lists of operating systems supported by various user interfaces, thumbnail images of images to display in a user interface, toolbar icons, speech libraries for voice-actuated commands and gestures, and the like.

Furthermore, image handle system 208 includes transceiver module 238. Transceiver module 238 is representative of functionality configured to transmit and receive data using any suitable type and number of communication protocols. For instance, data within image handle system 208 may be transmitted to server 216 with transceiver module 238. Furthermore, data can be received from server 216 with transceiver module 238. Transceiver module 238 can also transmit and receive data between computing devices 204. In one example, transceiver module 238 includes a low power wireless communication standard (e.g., a Bluetooth® protocol) for communicating data between computing devices 204.

Image handle system 208 also includes image gallery module 240. Image gallery module 240 is representative of functionality configured to obtain and manage images of image handle system 208, such as images that can have handles assigned to objects of the image, images in an animation sequence, thumbnail representations displayed in a user interface (e.g., thumbnail images of images in an animation sequence exposed in a user interface), images including a mesh, a rasterized image, images represented by vector graphics, and the like. Hence, image gallery module 240 may use transceiver module 238 to obtain any suitable data from any suitable source, including obtaining digital images from a user's directory of files on computing devices 204 or server 216, obtaining images from a user's photo gallery (e.g., an online photo sharing service, images stored in a user's image editing application, such as Photoshop®), images a user has posted in a social media post, blog, online comment, and the like, images a user has attached to an email, text, or other communication sent from or received by computing devices 204, images provided by a search service, such as an online search for digital images related to a search query, images obtained from a database of stock images, images provided by user 202, images captured by a computing device, such as with a camera integrated into one of computing devices 204, and the like. Images obtained by image gallery module 240 are stored in image data 228 of storage 226 and made available to modules of image handle application 242.

Image handle system 208 also includes image handle application 242. Image handle application 242 includes image module 244, user interface module 246, neural network module 248, cluster module 250, and handle module 252. These modules work in conjunction with each other to determine handle locations for artwork of an image and attributes of handles at the handle locations. Handles placed at the handle locations on artwork of an image can be used to deform the artwork and create an animation sequence.

Furthermore, though the description of image handle system 208 and image handle application 242 describes determining handle locations for a representation of an image (e.g., a rasterized image or mesh of artwork of an image) of an object, such as artwork, image handle system 208 and image handle application 242 can be used to determine handle locations for any suitable asset, such as a document, web page, map, slide, presentation, and the like.

Image module 244 is representative of functionality configured to obtain a representation of an image of an object, such as a rasterized image, a mesh of artwork of an image, vector graphics of artwork of an image, combinations thereof, and the like. Image module 244 can obtain any suitable representation of an image in any suitable way. In one example, image module 244 obtains an image from a database of images, such as a gallery maintained by image gallery module 240 or a database maintained by server 216 in assets 220. Additionally or alternatively, image module 244 can obtain an image from storage 226 that has been reconstructed from a deformed image or deformed mesh. In one example, image module 244 obtains a mesh of artwork of an image, such as a mesh generated as part of an animation sequence.

An image obtained by image module 244 can be any suitable type of image, such as a stand-alone image (e.g., an image not associated with other images), an image in a sequence of images (e.g., an animation sequence, a video, a page in a chapter of a book, a slide in a slideshow, and the like), or combinations thereof. In one example, an image obtained by image module 244 is extracted from an asset that contains other types of media than images, such as a web page containing images and text.

Furthermore, image module 244 can obtain an image represented by curves, such as a spline including piecewise segments of Bezier curves, polynomials of any suitable order (e.g., quadratic, cubic, quartic, etc.), cubic splines, lines, primitive shapes such as squares, rectangles, triangles, circles, ellipses, polygons, combinations thereof, and the like. In one example, image module 244 converts an image represented by curves to a rasterized image in greyscale by rasterizing the image represented by curves, and image handle system 208 determines handle locations for the rasterized image generated by image module 244.

A rasterized image generated by image module 244 can be any suitable type of rasterized image, such as a bit map, pixel values, dot matrix data structure, combinations thereof, and the like. In one example, a rasterized image includes a grayscale image with a transparency parameter (e.g., alpha channel) to represent transparency of pixels in the image with a percentage of the transparency parameter. Furthermore, a rasterized image generated by image module 244 can include any suitable number of raster elements (e.g., pixels) whose values are represented by any suitable type of data, such as a number of bits, values in a coordinate system (e.g., a color coordinate system), combinations thereof, and the like. Moreover, image module 244 can rasterize an image in any suitable way, such as based on user-specified parameters (e.g., a user-designated resolution in terms of numbers of pixels), based on analyzing an image (e.g., for spectral content) and determining a resolution based on results of the analyzing (e.g., using a higher number of pixels for images with higher spectral content than images with lower spectral content), according to a default resolution, and the like.

A representation of an image obtained by image module 244, along with any suitable information, such as a source location of an image, a file format of an image, an indication whether the image is related to other images, such as a sequence number in an animation sequence, image metadata (e.g., information regarding a mesh of an image, curves representing an image, etc.), a rasterized version of an image, and the like, used by or calculated by image module 244 are stored in image data 228 of storage 226 and made available to modules of image handle application 242. In one example, image module 244 provides an image to neural network module 248 and user interface module 246.

User interface module 246 is representative of functionality configured to generate, manage, and cause display on any suitable user interface, such as a user interface including a digital image and indicators of handles for the digital image. A user interface of user interface module 246 can expose any suitable data, such as an input image (e.g., a rasterized image), a mesh of artwork of an image, an animation sequence of images, a deformed image (e.g., an image formed by moving a handle on an image to deform the image), an output image generated by a neural network, such as an output image including clusters of pixels against a background (e.g., clusters of bright pixels indicating candidate handle locations against a uniform black background), training images, alpha masks, combinations thereof, and the like.

A user interface of user interface module 246 can expose any suitable control options, such as options for selecting images, including lists of images and thumbnail representations of images, options for selecting a threshold intensity level, options for selecting a desired density of handles and handle locations for artwork of an image, options for selecting a neural network from a plurality of neural networks (e.g., a list of neural networks with a description of the training sets used to train the neural networks), options to move a handle (e.g., a button to enable a handle at a selected location to be relocated to another location without deforming artwork of the image), combinations thereof, and the like.

A user interface of user interface module 246 can receive user-selections of any suitable control option exposed in the user interface. In one example, a user interface of user interface module 246 receives a user-selection indicating a density of handles for an object in an image, such as a selection of course, medium, or fine densities. Additionally or alternatively, a user interface of user interface module 246 can receive a user-selection of a threshold intensity level for comparison against an intensity level of a cluster of pixels. For instance, a user may adjustment a slider control exposed in a user interface of user interface module 246 to select a threshold intensity level.

In one example, a user interface of user interface module 246 exposes thumbnail representations of images, such as images obtained by image module 244. A user can select a thumbnail representation of an image and cause the selected image to be processed by image handle system 208, so that handle locations and attributes of handles at the handle locations for the selected image are exposed in a user interface of user interface module 246.

A user interface generated by user interface module 246, along with any suitable information, such as configurations settings of the user interface, user gestures, thumbnail images, user preferences, such as preferred locations of digital images exposed in a user interface, and the like, used by or calculated by user interface module 246 are stored in user interface data 236 of storage 226 and made available to modules of image handle application 242. In one example, a user interface generated by user interface module 246 is displayed by display 222, and user interface module communicates a selected threshold intensity level to cluster module 250 and a selected density of handles to neural network module 248.

Neural network module 248 is representative of functionality configured to generate an output image by applying a representation of an image to a neural network. An output image generated by neural network module 248 includes clusters of pixels, such as clusters of pixels indicating candidate handle locations against a uniform background. For instance, clusters of pixels can have intensities greater than an intensity of the background.

Neural network module 248 can include any suitable type and number of neural networks. A neural network of neural network module 248 can be trained in any suitable way. In one example, a neural network of neural network module 248 is trained with input images having user-specified handle locations used to determine ground-truth images. An input image may be a rasterized image (e.g., a bit map in greyscale), a mesh of an object in an image (e.g., a triangle mesh), combinations thereof, and the like. A neural network of neural network module 248 can be trained with output images (e.g., ground-truth images) generated by convolving Gaussian filters with white patches at user-specified handle locations on a black background. The user-specified handle locations correspond to expert-specified handle locations, such as locations determined by trained experts in generating animation sequences, as opposed to novice users. In one example, a neural network of neural network module 248 is trained with a loss function including a pixel loss term, an adversarial loss term, and a perceptual loss term, such as by adjusting parameters of the neural network to minimize the loss function.

Additionally or alternatively, neural network module 248 includes a plurality of neural networks, such as pre-trained neural networks that have been trained with different training sets (e.g., different input images, different output images, or both different input images and different output images). In one example, neural network module 248 includes a plurality of neural networks that have been trained with different densities of handles and handle locations, such as coarse, medium, and fine. For instance, a fine training set (e.g., input image and output image pairs) may be generated at a fine resolution with input images having user-specified handle locations and output images generated by convolving Gaussian filters with white patches at the user-specified handle locations on a black background. Coarse and medium training sets can be generated by decimating (e.g., removing) handle locations from images of a fine training set, such as by removing one third of handle locations from images of a fine training set to generate a medium training set and removing one half of handle locations from images of a fine training set to generate a coarse training set. Fine, medium, and coarse training sets can be used to train neural networks according to different densities of handles. Accordingly, a user may select one of a plurality of densities of handle locations, one of a plurality of neural networks, or combinations thereof, to generate a desired density of handle locations for object or artwork of an image.

Neural network module 248 can include any suitable number of neural networks corresponding to any suitable density of handle locations. Coarse, medium, and fine densities described above are examples of different densities. Additionally or alternatively, neural network module 248 can include N neural networks for some integer N, corresponding to N different densities of handle locations, and a user may select a value of N (e.g., a number from one to ten), such as via a user interface of user interface module 246, to select one of N neural networks of neural network module 248.

In one example, a neural network of neural network module 248 generates attributes for each cluster of pixels in an output image generated by neural network module 248. Hence, a neural network of neural network module 248 generates attributes for a handle of a candidate handle location indicated by clusters of pixels in an output image generated by neural network module 248. Neural network module 248 can generate any suitable attribute for a handle at a handle location determined by image handle system 208. In one example, attributes of handles generated by neural network module 248 describe degrees of freedom of a respective handle, such as rigid, flexible, and anchor. For instance, a handle location for a person's shoulder may include an attribute indicating the shoulder is more rigid, and less flexible, than an attribute of a handle location for a person's hand. Additionally or alternatively, a handle location may include an attribute identifying a handle as an anchor. A handle identified as an anchor may remain at a fixed position when the artwork is deformed.

A neural network of neural network module 248 can generate attributes of handles in any suitable way. In one example, neural network module 248 includes a plurality of neural networks that have been trained with different data sets that include different attributes of handles, such as expert-specified attributes of handles. For instance, expert-users (e.g. trained graphic designers) may specify a degree of freedom of a handle in a training set, such as rigid, flexible, or anchor, or a numerical value (e.g., one to ten) indicating a degree of freedom. A numerical value of one may represent a handle location corresponding to an anchor handle, and a numerical value of ten may represent a handle location corresponding to a fully-flexible handle, with numerical values between one and ten denoting handle locations corresponding to handles with degrees of freedom proportional to respective numerical values between one and ten.

A neural network of neural network module 248 can be any suitable neural network. In one example, a neural network of neural network module 248 includes a conditional generative adversarial network having a generator with skip connections (described below in more detail with regards to FIG. 7 and FIG. 8). A generative adversarial network includes a generator trained to produce output images that cannot be distinguished from "real" images by an adversarially trained discriminator that is trained to detect the generator's "fake" images. Skip connections concatenate activations from a layer of an encoder of the generator to a layer of a decoder of the generator so that all information of a generator does not need to be processed by all layers of the generator, saving time and processing resources when operating a neural network of neural network module 248.

A neural network of neural network module 248 can be trained according to any suitable objective function. In one example, a neural network of neural network module 248 is trained with a loss function including a pixel loss term, an adversarial loss term, and a perceptual loss term. For instance, a loss function used to train a neural network of neural network module 248 can be expressed as $$\mathcal{L} = \lambda_1 \cdot L_{pix} + \lambda_2 \cdot L_{adv} + \lambda_3 \cdot L_{per}$$

where $L_{pix}$ denotes a pixel loss term, $L_{adv}$ denotes an adversarial loss term, $L_{per}$ denotes a perceptual loss term, and $\lambda_i$, i=1, 2, 3 are real-valued weights, such as numbers between zero and one.

In one example, a pixel loss term is determined from a distance between an output image generated by a neural network of neural network module 248 (e.g., by a generator of a generative adversarial network) and a ground-truth image (e.g., an output image of a pair of training images used to train a neural network), such as $$L_{pix} = E\{\|\hat{y}_i - G(x_i)\|\}$$

where $E\{\cdot\}$ denotes statistical expectation, $\|\cdot\|$ denotes any suitable norm, such as $l_1$, $l_2$, and the like, $\hat{y}$ denotes a ground-truth image, and $G(x_i)$ denotes an output image produced by generator $G(\cdot)$ for input image $x_i$.

An adversarial loss term can be determined from a generator $G(\cdot)$ and discriminator $D(\cdot)$ of a generative adversarial network of neural network module 248. Generator $G(\cdot)$ and discriminator $D(\cdot)$ are jointly trained so that the discriminator tries to distinguish between images generated by the generator and ground-truth images, while the generator tries to fool the discriminator into thinking its generated output image is real. In one example, an adversarial loss term is expressed as $$L_{adv} = \Sigma_i \log D(G(x_i)).$$

A perceptual loss term can be any suitable measure of perceptual loss (e.g., loss based on user perception). In one example, a perceptual loss term is determined by extracting features from images and determining a difference in a feature space of the features. For instance, features can be extracted from an output image generated by a neural network of neural network module 248 and from a ground-truth image using any suitable feature extractor, such as a pre-trained neural network (e.g., a visual geometry group (VGG) convolutional neural network). A perceptual loss term can be determined from the difference between features of the output image and the ground-truth image. Accordingly, a perceptual loss term can be determined from $$L_{pix} = E\{\|\mathcal{F}[\hat{y}_i] - \mathcal{F}[G(x_i)]\|\}$$

where $\mathcal{F}[\cdot]$ denotes features extracted from an image.

A neural network of neural network module 248, along with any suitable information, such as training data (e.g., pairs of images including an input image and an output (or ground-truth) image), a database of neural networks (e.g., a structured database organizing pre-trained neural networks in a hierarchy including an input-image level (e.g., different input-image levels in the hierarchy may correspond to different types of input images, such as a rasterized image and a triangle mesh), a handle-density level (e.g., different handle-density levels in the hierarchy may correspond to different densities of handles, such as coarse, medium, and fine), and the like), data used to generate training images (e.g., training images may be perturbed by translation, rotation, and scaling to expand a training set to include additional images, and data regarding the translation, rotation, and scaling, such as a maximum amount of translation, rotation, or scaling may be included the data used to generate training images), and the like, used by or calculated by neural network module 248 are stored in neural network data 230 of storage 226 and made available to modules of image handle application 242. In one example, neural network module 248 communicates an output image generated by neural network module 248 to cluster module 250.

Cluster module 250 is representative of functionality configured to determine a set of clusters of pixels in an output image generated by neural network module 248. In one example, cluster module 250 determines a set of clusters of pixels having a respective intensity level above a threshold intensity level, such as a user-specified threshold intensity level. A user-specified threshold intensity level can control a number of clusters in a set of clusters of pixels, and hence control a number of handle locations that are determined for an object (e.g., artwork) in an image.

Cluster module 250 can determine a set of clusters of pixels in an output image in any suitable way. In one example, cluster module 250 determines a set of clusters of pixels in an output image by identifying first clusters of pixels satisfying a cluster constraint, such as clusters of pixels including a minimum number of pixels grouped together and having at least a minimum intensity level (e.g., an average value of intensity for a cluster of pixels is equal to or greater than a minimum intensity level). Cluster module 250 can then determine a set of clusters of pixels (e.g., a subset of all clusters) by applying an intensity constraint to the first clusters of pixels. For instance, cluster module 250 includes only those clusters having an intensity level above a threshold intensity level (e.g., a user-specified intensity level) in a set of clusters of pixels determined by cluster module 250.

Cluster module 250 can determine any suitable representation of a set of clusters of pixels, such as a list including locations of pixels in clusters of a set of clusters, a mask of an image that identifies clusters of a set of clusters, a bit-map that identifies clusters of a set of clusters, combinations thereof, and the like.

A set of clusters of pixels of an output image determined by cluster module 250, along with any suitable information, such as a representation of a set of clusters of pixels (e.g., a list of clusters, a mask of an image depicting clusters, etc.), intensity levels of clusters (e.g., an average intensity level of a cluster of pixels generated by cluster module 250 and used to compare to a threshold intensity level), a threshold intensity level used to generate a set of clusters of pixels, a number of clusters in a set of clusters of pixels, a number of clusters not satisfying a threshold intensity constraint and not included in a set of clusters of pixels determined by cluster module 250, a size of a cluster in a set of clusters of pixels (e.g., a surface area in number of pixels), locations of clusters of pixels, and the like, used by or calculated by cluster module 250 are stored in cluster data 232 of storage 226 and made available to modules of image handle application 242. In one example, cluster module 250 provides a set of clusters of pixels (e.g., a representation of clusters of pixels, such as a list or mask) to handle module 252.

Handle module 252 is representative of functionality configured to determine a respective handle location for each cluster of a set of clusters from cluster module 250. In one example, handle module 252 determines a respective handle location of an object in an image for each cluster of a set of clusters from a respective centroid of each cluster. A centroid can include any suitable centroid calculation, such as a center-of-mass, barycentric coordinates, a weighted center-of-mass (e.g., with weights assigned to pixels, such as in proportion to an intensity of a pixel), a centroid calculated for some, but not all pixels of a cluster (e.g., pixels with intensities below a specified intensity or beyond a threshold distance from a location in a cluster, such as a center of a circle encompassing a specified percentage of the pixels of a cluster, may be omitted from the centroid calculation), combinations thereof, and the like.

In one example, a handle location determined by handle module 252 includes a coordinate for the handle location, such as a Cartesian coordinate, polar coordinate, and the like. A coordinate of a handle location locates the handle location on an image (e.g., an object or artwork in an image). For instance, handle module 252 may generate a table of handle locations, including an entry for each handle location populated with a coordinate locating the handle location.

Additionally or alternatively, a handle location determined by handle module 252 can include an attribute classifying a degree of freedom for the handle location (e.g., a degree of freedom such as rigid, flexible, or anchor for a handle at the handle location). Handle module 252 may generate a table of handle locations, including an entry for each handle location populated with an attribute classifying a degree of freedom for a handle of the handle location.

In one example, handle locations determined by handle module 252 are exposed in a user interface of user interface module 246. For instance, a handle can be displayed with a designator at a coordinate on an image for each handle location determined by handle module 252. A designator of a handle can be any suitable designator. In the example in FIG. 2, handles 212 are denoted with black circles surrounded by a white ring. In one example, a designator of a handle at a handle location indicates an attribute of the handle at the handle location. For instance, different designators can be used to visually distinguish between handles of different attribute types, such as different color designators, different shapes, numerical values (e.g., a value of a degree of freedom of a handle from one to ten), combinations thereof, and the like.

In one example, emoticons are used to indicate handles at handles locations on an object of an image, and different emoticons represent different attributes of handles. For instance, an emoticon conveying fast movement, such as a road runner, sports car, jet airplane, and the like can be used to indicate a handle with full movement (e.g., flexible or having a value of ten on a scale of one to ten). An emoticon conveying slow movement, such as a turtle or snail can be used to indicate a handle with limited movement (e.g., rigid with some, but not full movement, such as having a value of three on a scale of one to ten), and an emoticon conveying no movement, such as a stop sign, can be used to indicate an anchor, such as having a value of zero on a scale of one to ten.

An example of computer code that can be used by cluster module 250, handle module 252, or both cluster module 250 and handle module 252 to determine a set of clusters of pixels in an output image and a respective handle location for each cluster of a set of clusters is described below in Table 1.

TABLE 1

Example Computer Code

```
img = imread(path);
level = graythresh(img);
bw = imbinarize(img(:,:,1),level);
s   = regionprops(bw,'centroid');
centroids = cat(1, s.Centroid);
imshow(img);
plot(centroids(:,1), centroids(:,2), 'r*')
```

In the example computer code of Table 1, a threshold intensity level is denoted by the variable "level". For each cluster of pixels having an intensity greater than a value of "level", handle locations are determined with Cartesian coordinates.

Handle locations determined by handle module 252, along with any suitable information, such as coordinates of handle locations, attributes of handles, a centroid algorithm used to determine a handle location (e.g., center-of-mass, weighted center-of-mass, and the like), thresholds used to include or exclude pixels of a cluster in a centroid calculation, an indication of a density of handle locations, such as coarse, medium, or fine, and the like, used by or calculated by handle module 252 are stored in handle data 234 of storage 226 and made available to modules of image handle application 242. In one example, handle module 252 provides handle locations including coordinates and attributes of handles to user interface module 246, which generates a user interface that exposes the handles at the handle locations with designators indicating the attributes.

Having considered an example digital medium environment, consider now a discussion of example images in accordance with one or more aspects of the disclosure.

Example Images

Figure 3:
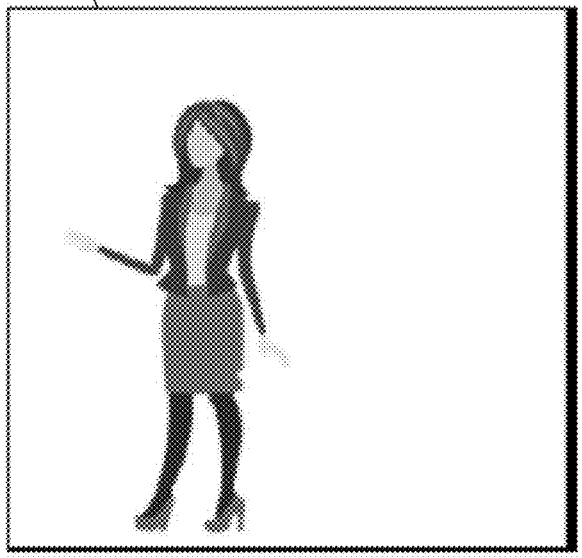
FIG. 3 illustrates example images in accordance with one or more aspects of the disclosure.
Figure 3:
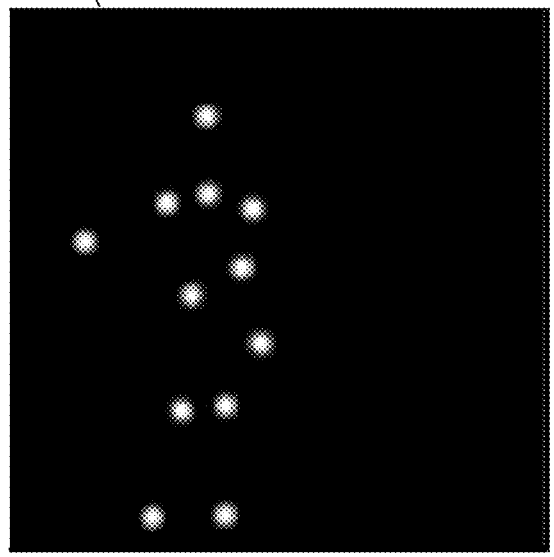
Figure 3:
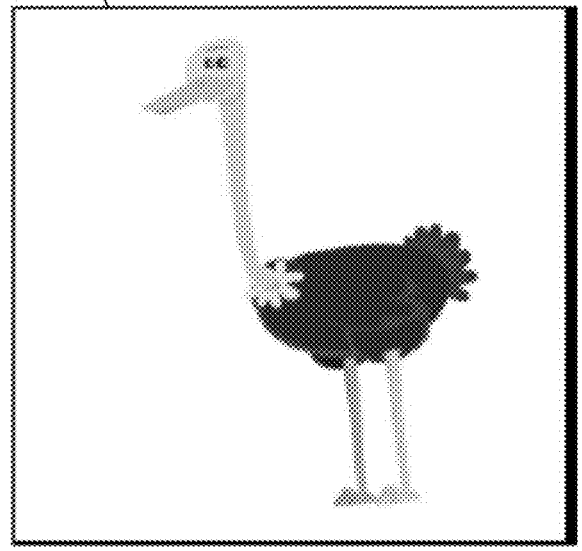
Figure 3:
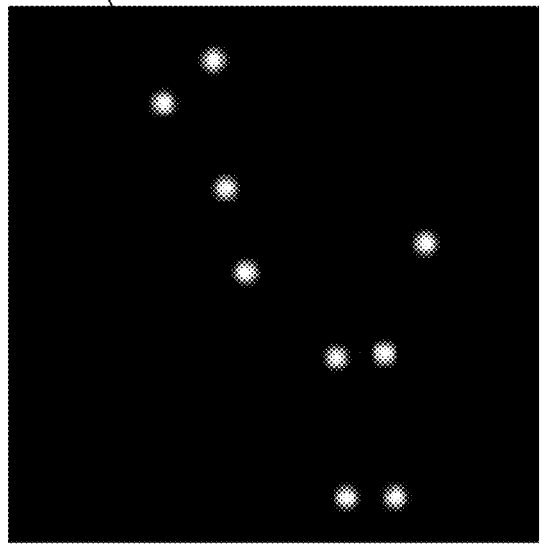

FIG. 3 illustrates example images 300 in accordance with one or more aspects of the disclosure. Images 300 include two pairs of images, and each pair of images includes an input image, such as an input image obtained by image module 244 in FIG. 2, and an output image generated by neural network module 248. A first pair of images includes input image 302 and output image 304, and a second pair of images includes input image 306 and output image 308.

Input image 302 includes an object, artwork depicting a person (e.g., a woman). Input image 306 includes an object, artwork depicting a bird. Input image 302 and input image 306 are examples of rasterized images in greyscale. Additionally or alternatively, (not shown) an input image can include a mesh (e.g., a triangle mesh) of artwork of an input image.

Output image 304 is an example of an output image generated by a neural network of neural network module 248 when input image 302 is provided as input to the neural network. Output image 304 includes clusters of pixels having a bright intensity against a black, uniform background. Thus, output image 304 includes clusters of pixels having intensities greater than an intensity of the background of output image 304. Clusters of pixels in output image 304 indicate candidate handle locations. For instance, a handle location for the artwork of input image 302 may be determined for each of the clusters of pixels in output image 304. Accordingly, clusters of pixels in output image 304 are in the shape of the person in input image 302.

Output image 308 is an example of an output image generated by a neural network of neural network module 248 when input image 306 is provided as input to the neural network. Output image 308 includes clusters of pixels having a bright intensity against a black, uniform background. Thus, output image 308 includes clusters of pixels having intensities greater than an intensity of the background of output image 308. Clusters of pixels in output image 308 indicate candidate handle locations. For instance, a handle location for the artwork of input image 306 may be determined for each of the clusters of pixels in output image 308. Accordingly, clusters of pixels in output image 308 are in the shape of the bird in input image 306.

Figure 4:
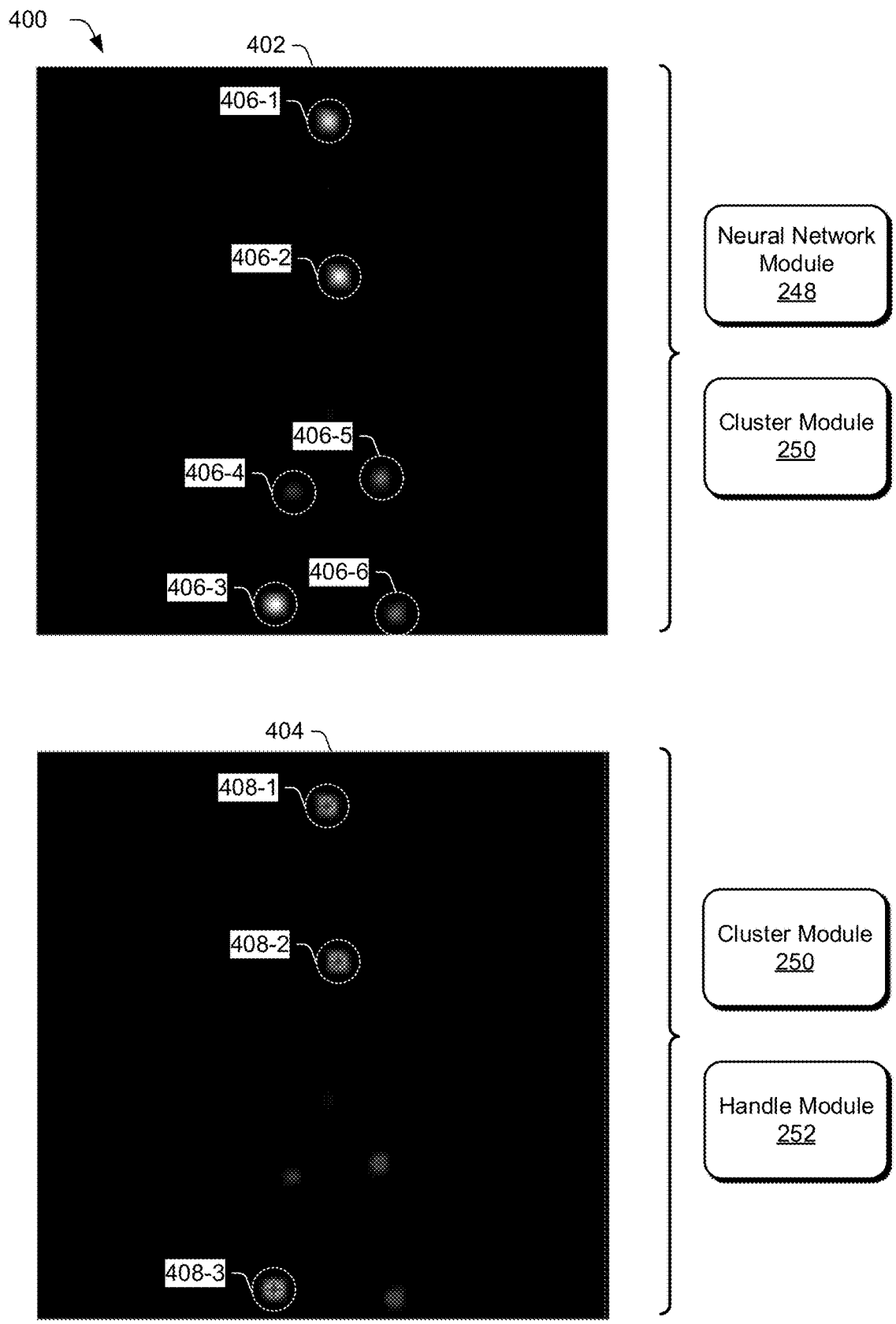
FIG. 4 illustrates example images in accordance with one or more aspects of the disclosure.

FIG. 4 illustrates example images 400 in accordance with one or more aspects of the disclosure. Images 400 include image 402 and image 404. Image 402 and image 404 are examples of an output image generated by a neural network of neural network module 248 and processed by cluster module 250 and handle module 252.

Image 402 includes a plurality of clusters of pixels having different intensities that are each greater than an intensity of the background (e.g., a black, uniform background). For instance, image 402 includes cluster 406-1, cluster 406-2, cluster 406-3, cluster 406-4, cluster 406-5, and cluster 406-6 (collectively clusters 406). Clusters 406 are denoted in FIG. 4 by a respective dotted circle enclosing the respective cluster. The background of image 402 is a uniform black background.

In the example in FIG. 4, cluster 406-1, cluster 406-2, and cluster 406-3 have intensities greater than intensities of cluster 406-4, cluster 406-5, and cluster 406-6. For instance, pixels of cluster 406-1, cluster 406-2, and cluster 406-3 are brighter than pixels of cluster 406-4, cluster 406-5, and cluster 406-6.

Cluster module 250 evaluates respective intensities of clusters 406 against an intensity constraint, such as by comparing respective intensities of clusters 406 to a user-specified threshold intensity level. In the example in FIG. 4, cluster module 250 identifies cluster 406-1, cluster 406-2, and cluster 406-3 as belonging to a set of clusters of image 402 satisfying an intensity constraint, such as having respective intensities greater than a threshold intensity level, while cluster 406-4, cluster 406-5, and cluster 406-6 do not satisfy the intensity constraint, and therefore are not included in the set of clusters determined by cluster module 250.

For each cluster in the set of clusters in image 402 identified as satisfying an intensity constraint, e.g., cluster 406-1, cluster 406-2, and cluster 406-3, handle module 252 determines a respective handle location. Hence, image 404 identifies handle location 408-1, handle location 408-2, and handle location 408-3 (collectively handle locations 408) that correspond to cluster 406-1, cluster 406-2, and cluster 406-3, respectively. Handle locations 408 are designated with cross hairs at coordinates on image 404 corresponding to respective centroids of cluster 406-1, cluster 406-2, and cluster 406-3. By contrast, since cluster 406-4, cluster 406-5, and cluster 406-6 do not satisfy the intensity constraint of cluster module 250, handle module 252 does not determine handle locations for cluster 406-4, cluster 406-5, and cluster 406-6, and image 404 does not include cross hairs designating handle locations for cluster 406-4, cluster 406-5, and cluster 406-6.

Figure 5:
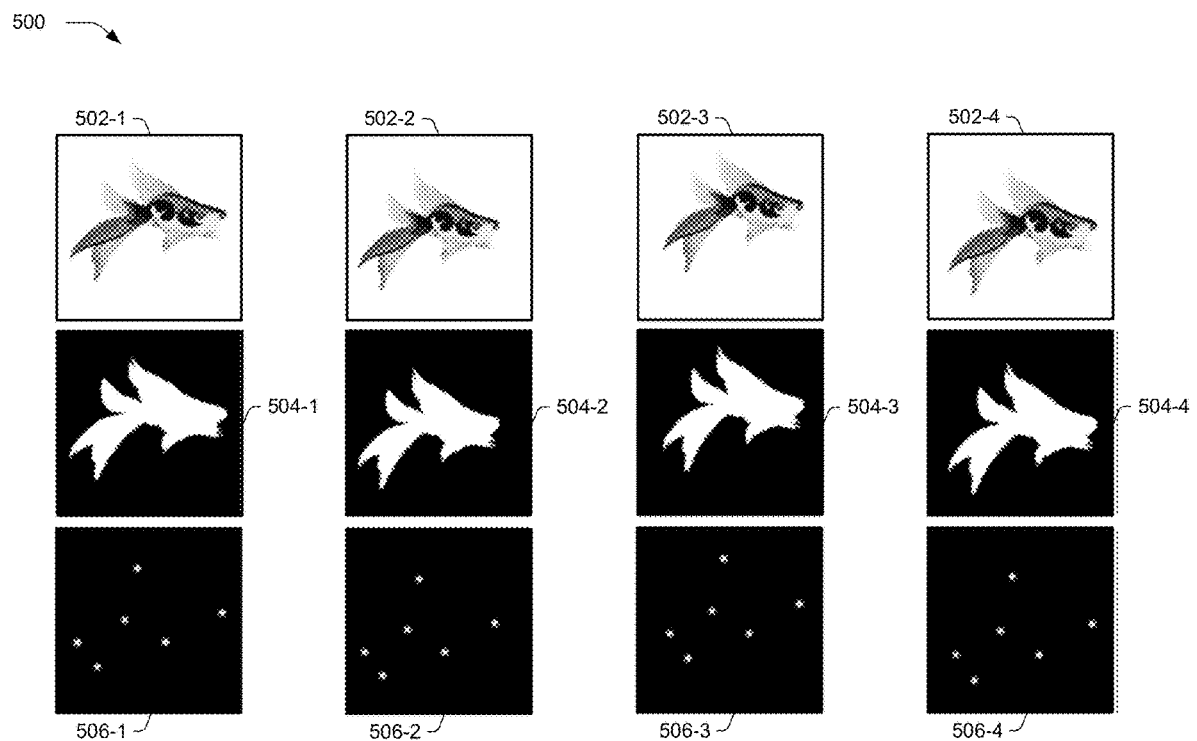
FIG. 5 illustrates example images in accordance with one or more aspects of the disclosure.

FIG. 5 illustrates example images 500 in accordance with one or more aspects of the disclosure. Images 500 are examples of training images that can be used to train a neural network of neural network module 248. Images 500 includes four sets of images, each set including an input image, an alpha mask, and an output image. Input images include input image 502-1, input image 502-2, input image 502-3, and input image 502-4 (collectively input images 502). Alpha masks include alpha mask 504-1, alpha mask 504-2, alpha mask 504-3, and alpha mask 504-4 (collectively alpha masks 504). Output images include output image 506-1, output image 506-2, output image 506-3, and output image 506-4 (collectively output images 506).

An input image of input images 502 and a corresponding output image of output images 506 form a pair of training images, such as input image 502-1 and output image 506-1. Output images 506 include ground-truth images and can be generated in any suitable way. In one example, an output image (e.g., one of output images 506) is formed by receiving user-specified handle locations for an input image, (e.g., expert-specified handle locations for one of input images 502) and convolving Gaussian filters with white patches at the user-specified handle locations on a black background. Hence, one of input images 502 and a corresponding one of output images 506 form a pair of training images suitable to train a neural network to generate an output image like output image 304 or output image 308 in FIG. 3.

To expand the number of images to train a neural network, images 500 includes images that have been formed from another image of images 500. In the example in FIG. 5, input image 502-2, input image 502-3, and input image 502-4 have been generated by altering input image 502-1, such as by scaling, translating, rotating, or combinations thereof, the artwork of input image 502-1. Hence, the artworks in input image 502-2, input image 502-3, and input image 502-4 include a fish that has been perturbed by scaling, translating, rotating, and the like, the fish included in the artwork of input image 502-1. For instance, relative to the fish of input image 502-1, the fish of input image 502-2 has been moved down (towards the bottom of input image 502-2), the fish of input image 502-2 has been moved up (towards the top of input image 502-2), and the fish of input image 502-2 has been enlarged. In one example, scaling, translating, rotating, or combinations thereof is done with a neural network, such as a neural network module 248.

A same scaling, translating, and rotating applied to an input image is also applied to its corresponding output image to expand the training data set. For instance, clusters of pixels of output image 506-2 have been moved by a same amount as the artwork of input image 502-2, clusters of pixels of output image 506-3 have been moved by a same amount as the artwork of input image 502-3, and clusters of pixels of output image 506-4 have been scaled by a same amount as the artwork of input image 502-4.

Images 500 also includes alpha masks 504 that have been created for respective input images 502. For instance, alpha mask 504-1 is generated for input image 502-1, alpha mask 504-2 is generated for input image 502-2, alpha mask 504-3 is generated for input image 502-3, and alpha mask 504-4 is generated for input image 502-4. An alpha mask is provided as an additional input to a neural network to help the neural network distinguish the artwork of an image from a background of an image. Accordingly, a neural network of neural network module 248 can generate handle locations for artwork of an input image rather than a background of the input image.

Having considered example images, consider now a discussion of example systems usable to determine image handle locations in accordance with one or more aspects of the disclosure.

Example Image Handle Systems

Figure 6:
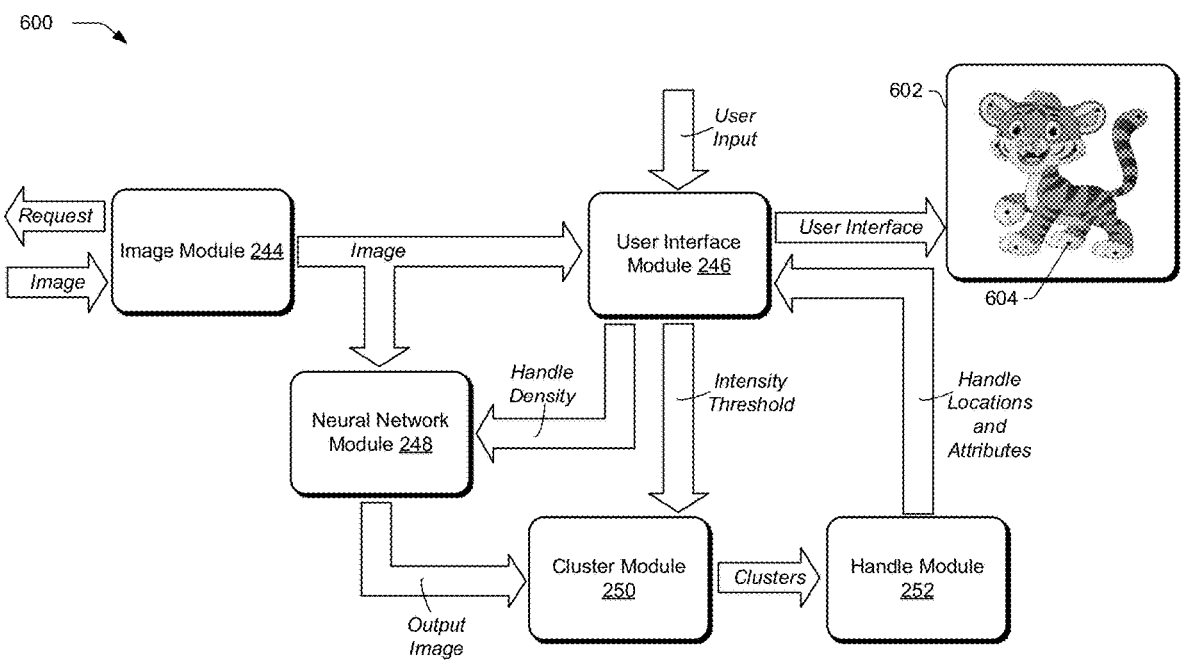
FIG. 6 illustrates an example system usable to determine image handle locations in accordance with one or more aspects of the disclosure.

FIG. 6 illustrates an example system 600 usable to determine image handle locations in accordance with one or more aspects of the disclosure. In this implementation, system 600 includes the modules of image handle application 242 as described in FIG. 2, e.g., image module 244, user interface module 246, neural network module 248, cluster module 250, and handle module 252. System 600 is one example of image handle system 208 that can be constructed using the modules of image handle application 242. For instance, signals can be redefined, and modules can be modified, combined, divided, added, or removed to form a modified system, without altering the functionality of system 600. Accordingly, such modified systems are considered to be within the scope of the disclosure.

Furthermore, for simplicity system 600 is limited to the modules of image handle application 242 and a description of some of their interconnects. System 600 can, however, include any suitable signals and communications between modules omitted for simplicity. Such signals may include system clocks, counters, image indicators, sequence indicators, reset signals, cluster indicators, and the like. In one example, system 600 can operate in real time (e.g., with no perceptible delay to a user). Accordingly, signals can be calculated by the modules of system 600 and communicated between the modules of system 600 without significant delay, so that a handle locations can be generated and exposed in a user interface without perceptible delay to a user.

Moreover, system 600 can be implemented on any suitable device or devices. In one example, system 600 is implemented on one computing device (e.g., one of computing devices 204 in FIG. 2). In another example, system 600 is implemented on more than one computing device. For instance, parts of system 600 can be implemented by a first computing device, such as computing device 204-1 in FIG. 2, and other parts of system 600 can be implemented by an additional computing device or devices, such as computing device 204-2. In one example, a server implements parts of system 600, such as server 216 in FIG. 2. A server can be remote, e.g., because it is not collocated with the first computing device. A server may be configured to receive signals of system 600 from a computing device (e.g., one or more of computing devices 204), process the received signals, such as with image handle support system 218, and transmit results of the processing back to the computing device. Hence, image handle support system 218 of server 216 in FIG. 2 may include system 600.

Additionally or alternatively, parts of system 600 can be implemented by an additional computing device that is collocated with a first computing device. For instance, one of computing devices 204 may be a first computing device, and another of computing devices 204 may be an additional, collocated computing device. The first computing device and the additional computing device may be operated by one or more users. Hence, system 600 provides for multiple users within an environment to share data included in system 600. For instance, an image can be obtained and output image generated for the input image by a first computing device operated by a first user, and the output image sent to another computing device operated by a second user. The second user can then adjust a threshold intensity level to control a number of clusters of pixels generated in a set of clusters of pixels in the output image that satisfy an intensity constraint, and send the set of clusters back to the first user and the first computing device. The first user on the first computing device can then use system 600 to determine handle locations from centroids of clusters in the set of clusters received from the second user on the second computing device. A user interface exposing handles at the handle locations and attributes of the handles can be displayed on the first computing device and shared with the second computing device, so both users can review the input image with handles overlaid on it.

Image module 244 obtains a representation of an image, such as a rasterized version of an image, vector graphics of an image, a mesh of artwork of an image, combinations thereof, and the like. Image module 244 can obtain an image in any suitable way. In one example, a user loads an image into system 600, such as an image including artwork, and creates an animation sequence based on the image obtained by image module 244.

Additionally or alternatively, image module 244 sends a request for an image. For instance, image module 244 may send a request for an image to a server, such as server 216 in FIG. 2, to obtain an image from a database of images, such as a database of animation sequences, artwork, graphics, and the like. Responsive to sending a request for an image, image module 244 can receive any suitable representation of an image.

In one example, a user enters a search term via a user interface of user interface module 246, and image module 244 constructs a search query based on the user-entered search term to obtain an image, such as by searching databases, the Internet, a computing device (e.g., one of computing devices 204 in FIG. 2), combinations thereof, and the like.

Additionally or alternatively, image module 244 can obtain an image by extracting the image from an asset (e.g., a web page, document, and the like), such as by removing the image from the asset. For instance, image module 244 may extract an image from an asset that contains an image and text by removing the image from the asset and discarding the text.

Image module 244 provides an image, such as a rasterized image, to neural network module 248 and user interface module 246.

User interface module 246 receives an image from image module 244. For instance, user interface module 246 may expose a user interface on a display of a computing device, including displaying an image obtained by image module 244. User interface module 246 also receives and a user input. User interface module 246 may receive any suitable user input. In the example in FIG. 6, user interface module 246 receives a user input (e.g., a user-selection of an option exposed in a user interface) indicating a desired density of handle locations to be determined for an object in an image obtained by image module 244, such as by selecting one of coarse, medium, and fine options exposed in a user interface. User interface module 246 provides an indication of a handle density, such as coarse, medium, or fine, corresponding to a received user input to neural network module 248.

User interface module 246 also receives a user input (e.g., a user-selection of a slider control exposed in a user interface) specifying a threshold intensity level. The threshold intensity level controls a number of handle locations determined for an image obtained by image module 244 by controlling a number of clusters in a set of clusters determined by cluster module 250. Accordingly, user interface module 246 provides an indication of a threshold intensity level corresponding to a received user input to cluster module 250.

Neural network module 248 receives a representation of an image from image module 244, such as a rasterized image. Neural network module 248 also receives an indication of a handle density, such as coarse, medium, or fine, from user interface module 246. Based on the indication of handle density received from user interface module 246, neural network module 248, selects a neural network from a plurality of available neural networks. Additionally or alternatively, neural network module 248 can select a neural network from a plurality of available neural networks based on a type of image received from image module 244. For instance, neural network module 248 may search a structured database of neural networks that maintains a hierarchy of neural networks, with levels of the hierarchy corresponding to different types of input images, such as a level for rasterized images, a level for triangle meshes, etc. Hence, neural network module 248 may access a particular level of a structured database based on a type of image received from image module 244.

Neural network module 248 applies an image received from image module 244 as an input image to a neural network selected by neural network module 248 to produce an output image. Output image 304 and output image 308 in FIG. 3 are examples of output images generated by neural network module 248. An output image generated by neural network module 248 includes clusters of pixels against a background, e.g., a uniform background. The clusters of pixels in an output image generated by neural network module 248 have intensities greater than an intensity of the background of the output image, and indicate candidate handle locations. For instance, a handle location may be determined for each cluster of pixels satisfying an intensity constraint. Neural network module 248 provides an output image generated by neural network module 248 to cluster module 250.

Cluster module 250 receives an output image from neural network module 248 and an indication of a threshold intensity level (e.g., corresponding to a received user input) from user interface module 246. Cluster module 250 determines a set of clusters of pixels in an output image received from neural network module 248 based on a threshold intensity level received from user interface module 246. Cluster module 250 can determine a set of clusters of pixels in any suitable way.

In one example, cluster module 250 determines a set of clusters of pixels that satisfy an intensity constraint. For instance, cluster module 250 can determine a respective intensity level for each cluster of pixels in an output image, such as by calculating an average intensity level for each cluster of pixels, a representative intensity level for each pixel (e.g., by selecting an intensity level of one pixel within each cluster of pixels), and the like. Cluster module 250 can then compare a respective intensity level determined for each cluster of the clusters of pixels to a threshold intensity level received from user interface module 246, and determine a set of clusters of pixels based on the comparison. For instance, each cluster of pixels having a respective intensity level greater than a threshold intensity level can be included in a set of clusters of pixels determined by cluster module 250. Clusters of pixels not satisfying the intensity constraint (e.g., having respective intensity levels not greater than a threshold intensity level) are not included in the set of clusters of pixels determined by cluster module 250. A set of clusters of pixels determined by cluster module 250 to satisfy an intensity constraint based on a threshold intensity level is provided to handle module 252.

Handle module 252 receives a set of clusters of pixels from cluster module 250 and determines a respective handle location for each cluster of the set of clusters. In one example, handle module 252 evaluates a centroid of each cluster to determine coordinates of a respective handle location. A centroid can include a center-of-mass calculation to determine a coordinate (e.g., Cartesian coordinate, polar coordinate, and the like) for a handle location on an object or artwork of an image.

Additionally or alternatively, handle module 252 determines, for each handle location, an attribute classifying a degree of freedom for a handle at the respective handle location, such as rigid, flexible, anchor, a numerical indicator indicating a relative degree of freedom (e.g., a number from one to ten), combinations thereof, and the like. In one example, attributes are determined by neural network module 248 and included in metadata of an output image provided to cluster module 250. Cluster module 250 extracts the metadata and tags each cluster with an attribute of a handle for each cluster.

Handle module 252 provides handle locations, including coordinates for handle locations and attributes of handles at the handle locations, to user interface module 246.

User interface module 246 receives handle locations (e.g., coordinates for handle locations and attributes of handles at the handle locations), and generates a user interface based on the handle locations. In one example, user interface module 246 overlays indicators of handles at the handle locations on an input image received from image module 244. For instance, image 602 is an example of a part of a user interface generated by user interface module 246. Image 602 includes artwork depicting a tiger. Superimposed on image 602 are a plurality of handles 604 at handle locations determined by system 600.

Handles 604 have been placed on the artwork of image 602 by system 600 at handle locations that respect the structure and symmetry of the artwork, such as on the tiger's feet, ears, tail, cheeks, and torso. Accordingly, handles 604 can be used to deform the tiger and create a realistic animation sequence (e.g., so that the tiger walks in a realistic fashion).

Figure 7:
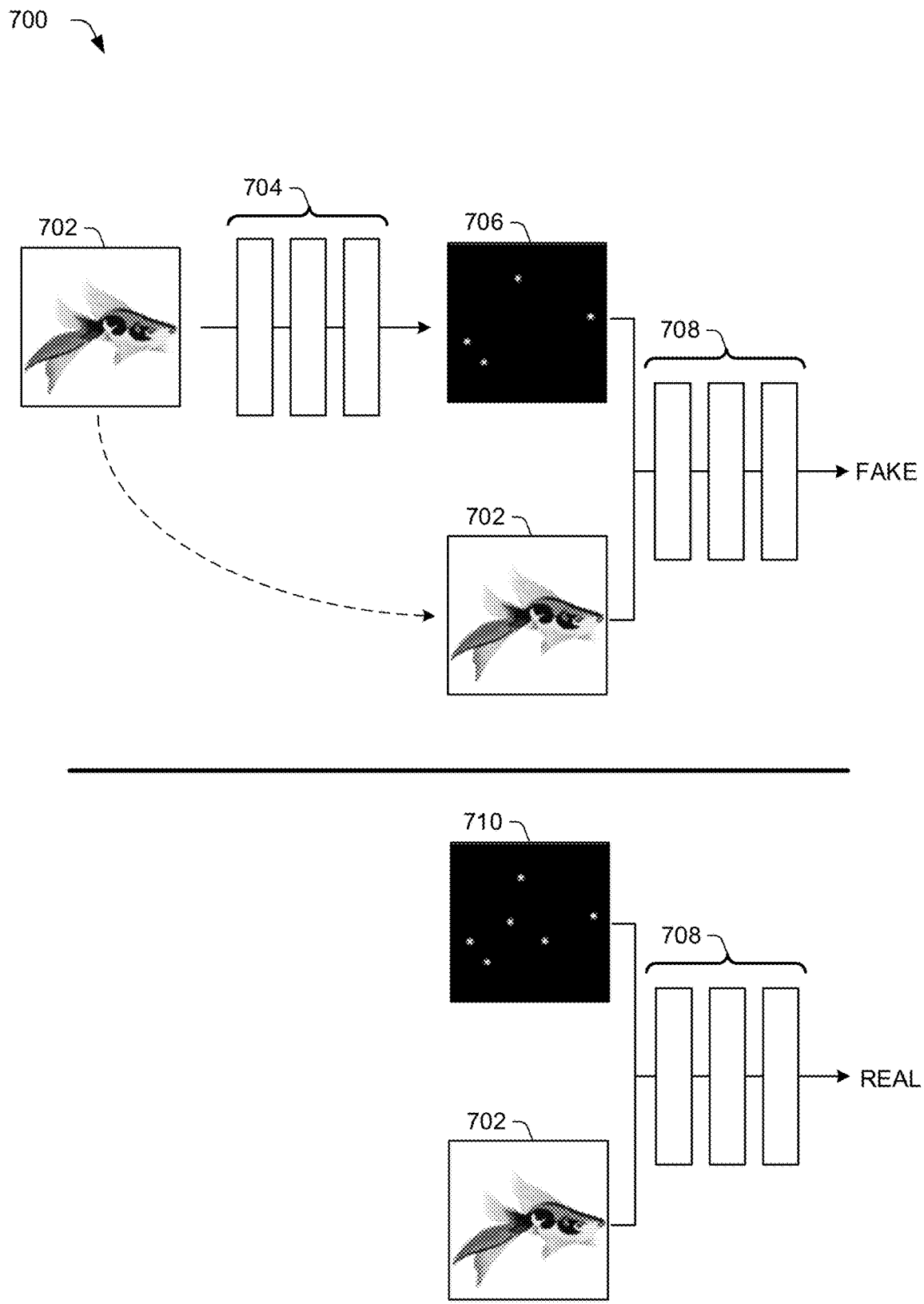
FIG. 7 illustrates an example system in accordance with one or more aspects of the disclosure.

FIG. 7 illustrates an example system 700 in accordance with one or more aspects of the disclosure. System 700 is an example of a neural network of neural network module 248 in FIG. 2. System 700 includes a conditional generative adversarial network in which a generator and a discriminator are jointly trained so that the discriminator tries to distinguish between images generated by the generator and ground-truth images, while the generator tries to fool the discriminator into thinking its generated output image is real.

System 700 includes input image 702 which is provided to generator 704 as input. In the example in FIG. 7, input image 702 is a rasterized image in greyscale. However, system 700 can be trained with any suitable representation of an image, such as a rasterized image, a triangle mesh of an object in an image, vector graphics of artwork of an image, and the like.

Generator 704 generates output image 706 from input image 702. Generator 704 can be any suitable generator that translates an input image of a first type of image (e.g., a rasterized image in greyscale, a triangle mesh of an object in an image, vector graphics of artwork of an image, and the like) to an output image of a second type of image (e.g., an image including clusters of pixels against a uniform background to designate candidate handle locations, such as output image 706). In one example, generator 704 includes an encoder-decoder network where the input is passed through multiple layers of an encoder followed by multiple layers of a decoder (discussed below in more detail with regards to FIG. 8). Each layer performs a plurality of convolutions with multiple filters, and can be denoted according to $C_k$, where k denotes the number of filters in a layer. In one example, an encoder of generator 704 includes seven layers denoted by $C_{64}$-$C_{128}$-$C_{256}$-$C_{512}$-$C_{512}$-$C_{512}$-$C_{512}$, and a corresponding decoder of generator 704 includes the seven layers denoted by $C_{512}$-$C_{512}$-$C_{512}$-$C_{512}$-$C_{256}$-$C_{128}$-$C_{64}$.

Output image 706 generated by generator 704 and input image 702 are provided to discriminator 708. Discriminator 708 includes a neural network trained to distinguish between images generated by generator 704 and ground-truth images (e.g., images in a training set of images where handle locations have been determined by trained experts, such as output images 506 in FIG. 5). Discriminator 708 can include any suitable discriminator to distinguish between "real" images (e.g., ground-truth images) and "fake" images (e.g., images generated by generator 704). In one example, discriminator 708 includes a neural network including four layers denoted by $C_{64}$-$C_{128}$-$C_{256}$-$C_{512}$.

In the example in FIG. 7, discriminator 708 receives output image 706 generated by generator 704 and input image 702 in the top half of FIG. 7, and ground-truth image 710 and input image 702 in the bottom half of FIG. 7. Accordingly, discriminator 708 determines that output image 706 is not a real image (e.g., not a ground-truth image), and generates an output indicating a "fake" image in the top half of FIG. 7. Furthermore, discriminator 708 determines that ground-truth image 710 is not a fake image (e.g., not an image generated by generator 704), and generates an output indicating a "real" image in the bottom half of FIG. 7.

System 700 can be trained with a loss function including a pixel loss term, an adversarial loss term, and a perceptual loss term, as described above. In one example, generator 704 and discriminator 708 are trained by alternating between updating weights (e.g., filter coefficients) of generator 704 and updating weights of discriminator 708. For instance, weights of generator 704 may be updated on a first update cycle, and used to compute output images on a second update cycle for which weights of discriminator 708 are updated, and the process repeated so that weights of generator 704 and discriminator 708 are updated on alternate update cycles.

An update cycle may include processing of any suitable number of images. In one example, a training set of images includes P total image pairs of input images and ground-truth images. For instance, P may be 1000 image pairs in a training set. For efficiency, weights of generator 704, discriminator 708, or generator 704 and discriminator 708 may be updated on a batch basis, such as for every Q image pairs of the training set processed with P>Q. For instance, with P=1000, an appropriate value of Q may be 10.

By jointly training a generator and a discriminator so that the discriminator attempts to distinguish between images generated by the generator and ground-truth images, and the generator attempts to trick the discriminator into thinking its generated output image is real, system 700 is able to reliably generate output images to determine image handle locations. In one example, system 700 is pre-trained, so that at run-time (e.g., when system 700 is used in a user computing device, such as one of computing devices 204 in FIG. 2), discriminator 708 can be disabled while pre-trained generator 704 can generate output images for user-supplied input images. In this case, weights of generator 704 and discriminator 708 are not adjusted based on user data. Additionally or alternatively, discriminator 708 may not be disabled at run-time, so that generator 704 and discriminator 708 can learn in an on-line fashion. In this case, weights of generator 704 and discriminator 708 can be adjusted based on user data (e.g., user-supplied input images to system 700 and output images generated by system 700).

Figure 8:
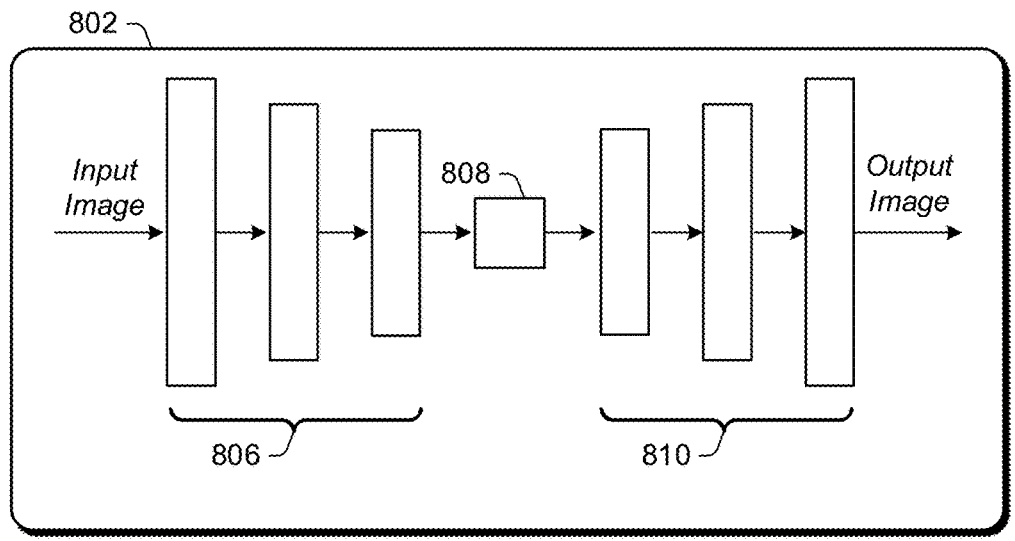
FIG. 8 illustrates example systems in accordance with one or more aspects of the disclosure.
Figure 8:
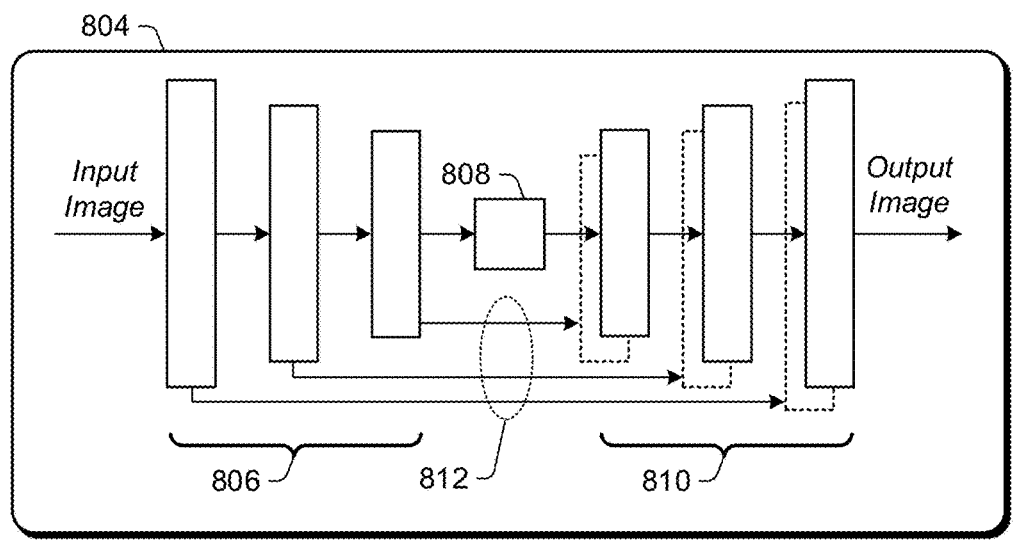

FIG. 8 illustrates example systems 800 in accordance with one or more aspects of the disclosure. Systems 800 includes network 802 and network 804. Network 802 and network 804 are examples of neural networks that can be included in generator 704 in FIG. 7. Network 802 is an example of an encoder-decoder, and network 804 is an example of an encoder-decoder with skip connections.

In network 802, an input image is passed through a series of layers of encoder 806 that progressively downsample, until bottleneck layer 808 is reached. In decoder 810 of network 802, the process of encoder 806 is reversed, and layers of decoder 810 progressively upsample data. In one example, layers of encoder 806 each downsample by a factor of two, and layers of decoder 810 each upsample by a factor of two.

Each layer of encoder 806 performs convolutions, and each layer of decoder 810 performs deconvolutions using spatial filters. In one example, convolutions in encoder 806 are performed with 4×4 spatial filters with stride 2. Stride refers to an amount a filter is shifted for each calculation of a convolution or deconvolution. Additionally or alternatively, deconvolutions in decoder 810 can be performed with 3×3 spatial filters and stride 1.

The architecture of network 802 requires that all information flow through all layers of network 802. To speed processing time and conserve processing resources, network 804 includes skip connections 812. Skip connections concatenate all channels at layer $\rho$ in encoder 806 to those at a mirrored layer $\mathcal{M}-\rho$ of decoder 810, where $\mathcal{M}$ is the total number of layers. Accordingly, network 804 efficiently processes data when information can be passed from one layer of encoder 806 to a corresponding layer of decoder 810, thus bypassing bottleneck layer 808.

The systems described herein constitute an improvement over systems that require adjustment of basis points of vector graphics to deform artwork of an image, or require manual placement of handles and handle locations on the artwork to deform the artwork, such as when generating an animation sequence. By using a neural network trained to translate input images (e.g., rasterized greyscale images) to output images that include clusters of pixels having intensities greater than a uniform background and that indicate candidate handle locations, handle locations are reliably and quickly determined by the systems described herein. Hence, a user's time needed to deform an artwork (e.g., to generate an animation sequence), and the associated user-frustration in doing so, are significantly reduced compared to systems that require adjustment of basis points of vector graphics or manual placement of handle locations on the artwork. Furthermore, by receiving user selections for desired densities of handles and threshold intensity levels, a user can control the number of handles and handle locations determined for artwork of an image by the systems described herein, and therefore does not need to waste time adding or removing handles, as may be required by other systems that require manual placement of handles on artwork of an image.

Having considered example systems, consider now a discussion of example procedures for determining image handle locations in accordance with one or more aspects of the disclosure.

Example Procedures

Figure 9:
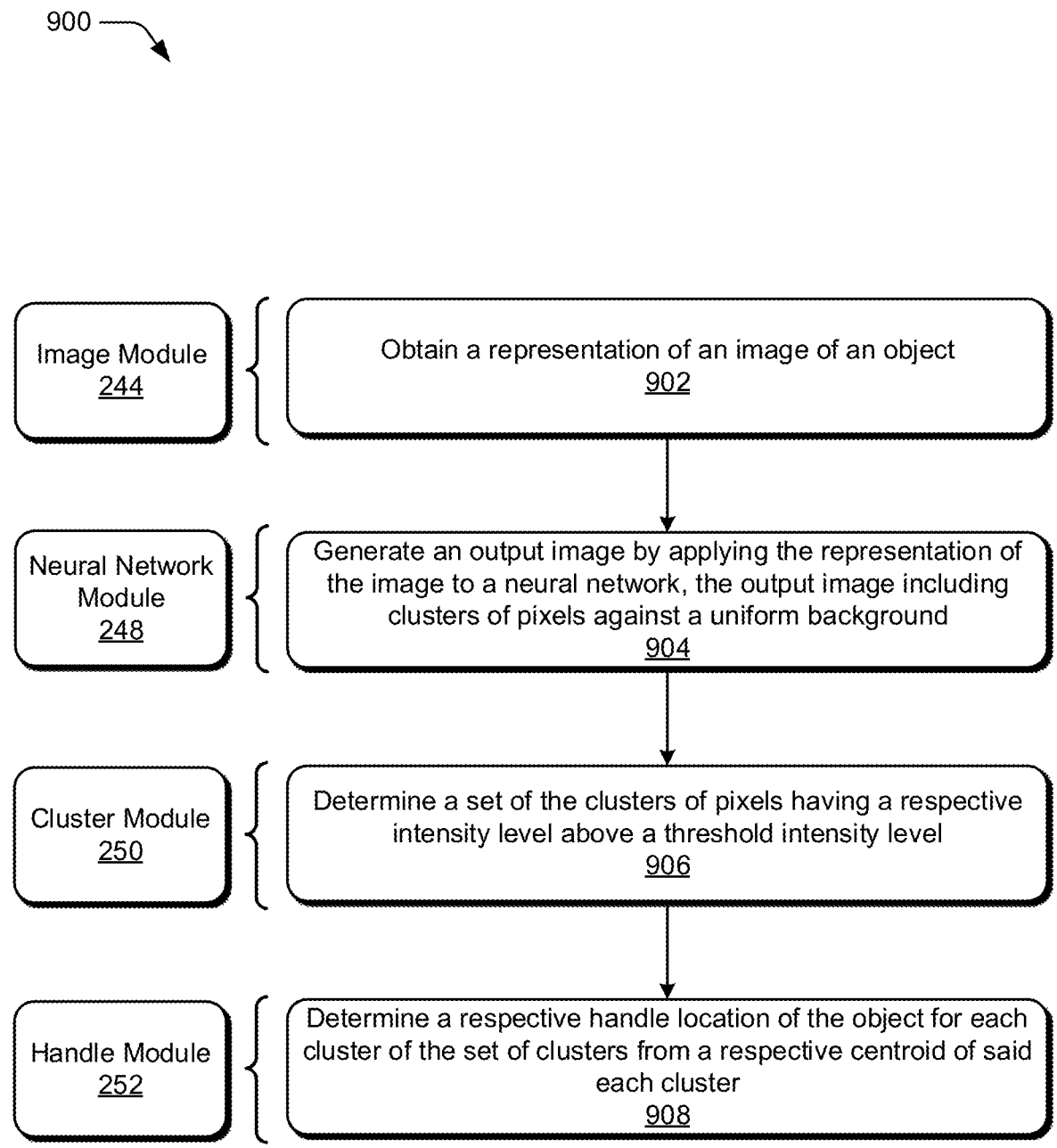
FIG. 9 illustrates a flow diagram depicting an example procedure in accordance with one or more aspects of the disclosure.

FIG. 9 illustrates an example procedure 900 for determining image handle locations in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 216 of FIG. 2 that makes use of an image handle system, such as system 600, system 700, system 800, or image handle system 208. An image handle system implementing procedure 900 may be an independent application that has been installed on the computing device, a service hosted by a service provider that is accessible by the computing device, a plug-in module to the computing device, or combinations thereof.

A representation of an image of an object is obtained (block 902). In one example, image module 244 obtains a representation of an image of an object. A representation of the image can include a rasterized version of the image. Additionally or alternatively, the representation of the image includes a triangle mesh of the image. The image can be any suitable image, and the object can be any suitable object. In one example, the object includes artwork, such as a cartoon or drawing, that can be deformed to generate an animation sequence.

An output image is generated by applying the representation of the image to a neural network, the output image including clusters of pixels against a uniform background (block 904). In one example, neural network module 248 generates an output image by applying the representation of the image to a neural network, the output image including clusters of pixels against a uniform background.

In one example, a user-selection indicating a desired density of handle locations to be determined for the object is received, and the neural network is selected from a plurality of available neural networks based on the desired density of handle locations indicated by the user-selection.

Additionally or alternatively, the neural network can be a conditional generative adversarial network having a generator with skip connections that concatenate activations from one layer of an encoder of the neural network to a corresponding layer of a decoder of the neural network. In one example, the neural network is trained with a loss function including a pixel loss term, an adversarial loss term, and a perceptual loss term.

A set of the clusters of pixels having a respective intensity level above a threshold intensity level is determined (block 906). In one example, cluster module 250 determines a set of the clusters of pixels having a respective intensity level above a threshold intensity level. Additionally or alternatively, the threshold intensity level can be a user-specified threshold intensity level and controls a number of handle locations that are determined for the object.

A respective handle location of the object for each cluster of the set of clusters is determined from a respective centroid of said each cluster (block 908). In one example, handle module 252 determines a respective handle location of the object for each cluster of the set of clusters is determined from a respective centroid of said each cluster. The respective handle location of the object can include a coordinate for the respective handle location and an attribute classifying a degree of freedom for the respective handle location. In one example, the attribute includes one of rigid, flexible, and anchor. Additionally or alternatively, the attribute includes a numerical indicator indicating a relative degree of freedom.

Figure 10:
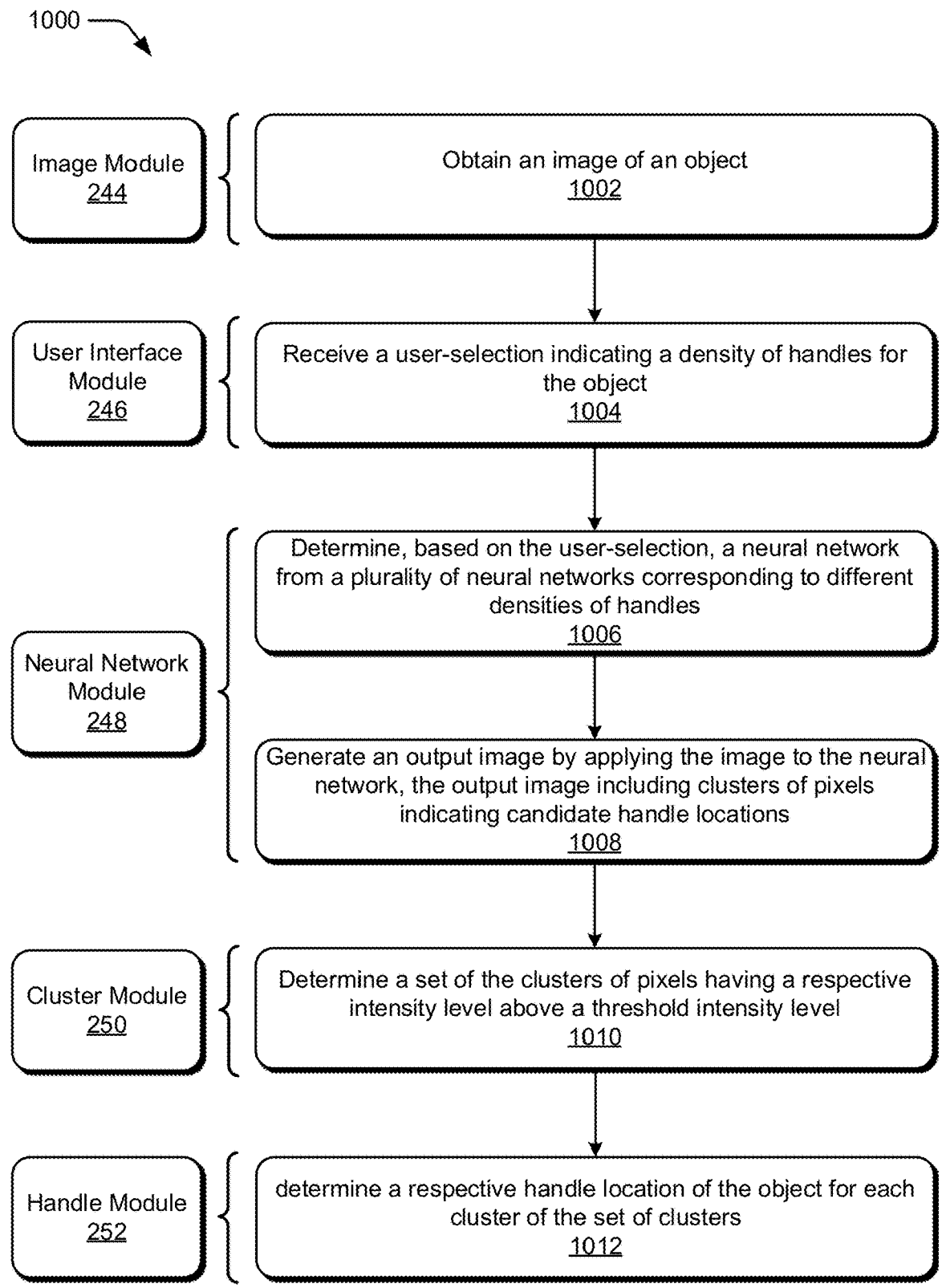
FIG. 10 illustrates a flow diagram depicting an example procedure in accordance with one or more aspects of the disclosure.

FIG. 10 illustrates an example procedure 1000 for determining image handle locations in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 216 of FIG. 2 that makes use of an image handle system, such as system 600, system 700, system 800, or image handle system 208. An image handle system implementing procedure 1000 may be an independent application that has been installed on the computing device, a service hosted by a service provider that is accessible by the computing device, a plug-in module to the computing device, or combinations thereof.

An image of an object is obtained (block 1002). In one example, image module 244 obtains an image of an object. The image can be any suitable image, and the object can be any suitable object. In one example, the object includes artwork, such as a cartoon or drawing, that can be deformed to generate an animation sequence.

A user-selection indicating a density of handles for the object is received (block 1004). In one example, user interface module receives a user-selection indicating a density of handles for the object. Additionally or alternatively, the density of handles for the object indicated by the user-selection can be one of coarse, medium, and fine.

Based on the user-selection, a neural network is determined from a plurality of neural networks corresponding to different densities of handles (block 1006). In one example, neural network module 248 determines, based on the user-selection, a neural network from a plurality of neural networks corresponding to different densities of handles.

An output image is generated by applying the image to the neural network, the output image including clusters of pixels indicating candidate handle locations (block 1008). In one example, neural network module 248 generates an output image by applying the image to the neural network, the output image including clusters of pixels indicating candidate handle locations.

In one example, the neural network is trained with input images having user-specified handle locations and output images generated by convolving Gaussian filters with white patches at the user-specified handle locations on a black background. Additionally or alternatively, the neural network can be further trained by providing to the neural network, for each of the input images, a respective alpha mask distinguishing a respective object of said each of the input images from a respective background of said each of the input images.

A set of the clusters of pixels having a respective intensity level above a threshold intensity level is determined (block 1010). In one example, cluster module 250 determines a set of the clusters of pixels having a respective intensity level above a threshold intensity level.

A respective handle location of the object is determined for each cluster of the set of clusters (block 1012). In one example, handle module 252 determines a respective handle location of the object for each cluster of the set of clusters. The respective handle location of the object for each cluster of the set of clusters can be determined from a center-of-mass of said each cluster.

In one example, a respective handle location of the object includes a coordinate for the respective handle location and an attribute indicating a degree of freedom of a respective handle at the respective handle location, further comprising displaying each said respective handle at the coordinate on the image for each said respective handle location with a respective designator indicating the attribute. Additionally or alternatively, the neural network can generate the clusters of pixels for handles having a same degree of freedom on a same channel of the neural network. For instance, clusters of pixels for anchors may be generated on one channel of a neural network, and clusters of pixels for flexible handles may be generated on another channel of the neural network.

Additionally or alternatively, a triangle mesh for the object can be generated, with each said respective handle location of the object being at a respective vertice of the triangle mesh. The image can be deformed based on the triangle mesh by translating or rotating at least one handle at a vertice of the triangle mesh.

Figure 11:
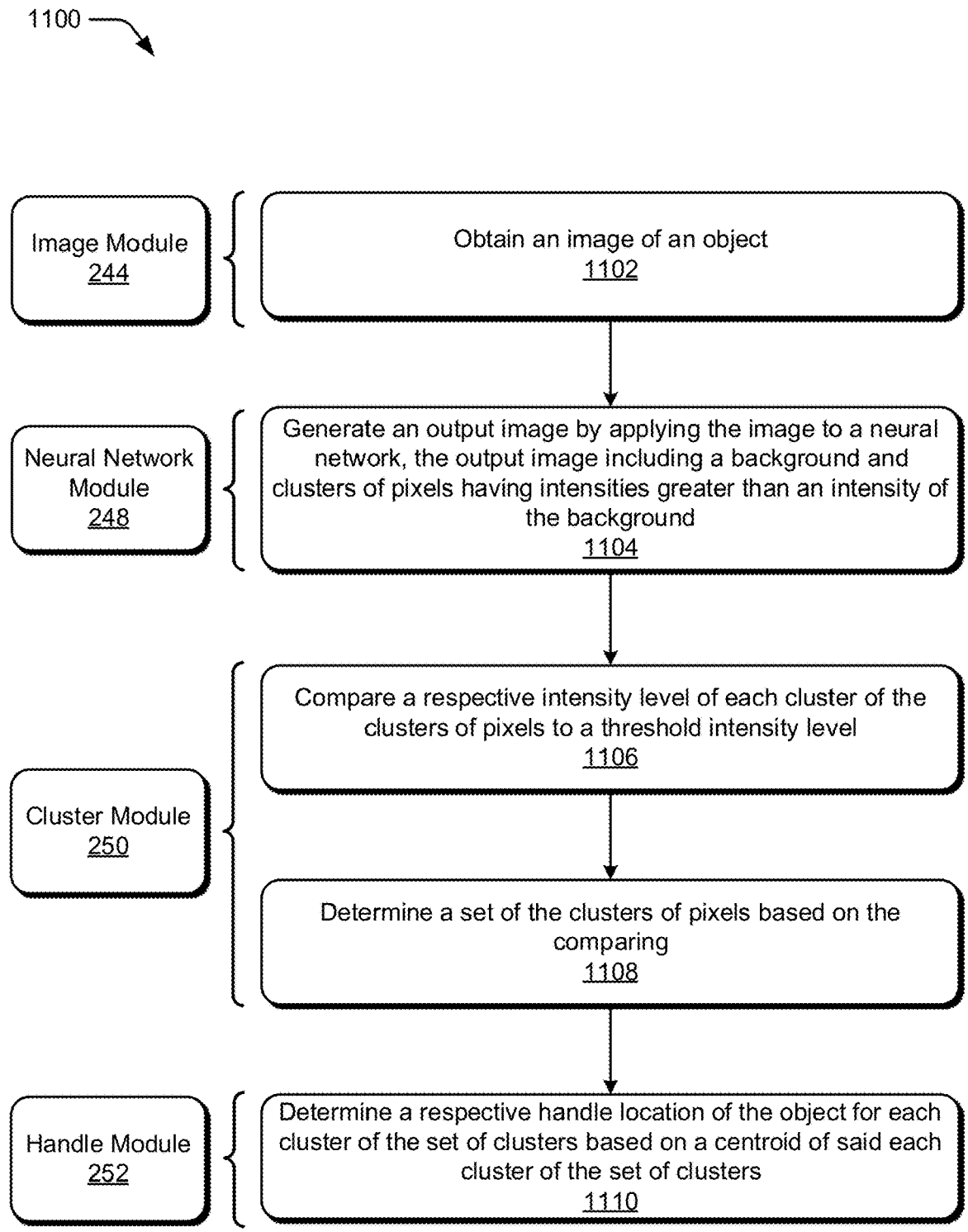
FIG. 11 illustrates a flow diagram depicting an example procedure in accordance with one or more aspects of the disclosure.

FIG. 11 illustrates an example procedure 1100 for determining image handle locations in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 216 of FIG. 2 that makes use of an image handle system, such as system 600, system 700, system 800, or image handle system 208. An image handle system implementing procedure 1100 may be an independent application that has been installed on the computing device, a service hosted by a service provider that is accessible by the computing device, a plug-in module to the computing device, or combinations thereof.

An image of an object is obtained (block 1102). In one example, image module 244 obtains an image of an object. The image can be any suitable image, and the object can be any suitable object. In one example, the object includes artwork, such as a cartoon or drawing, that can be deformed to generate an animation sequence.

An output image is generated by applying the image to a neural network, the output image including a background and clusters of pixels having intensities greater than an intensity of the background (block 1104). In one example, neural network module 248 generates an output image by applying the image to a neural network, the output image including a background and clusters of pixels having intensities greater than an intensity of the background.

A respective intensity level of each cluster of the clusters of pixels is compared to a threshold intensity level (block 1106). In one example, cluster module 250 compares a respective intensity level of each cluster of the clusters of pixels to a threshold intensity level.

In one example, the threshold intensity level is determined based on a number of the clusters of pixels in the output image. Additionally or alternatively, the threshold intensity level can be determined based on the intensities of the clusters of pixels in the output image. For instance, cluster module 250 can determine a threshold intensity level so that a predetermined amount of clusters of pixels have intensities below the threshold intensity level, such as by determining a threshold intensity level so that at least a number of clusters of pixels (e.g., at least one cluster), at least a percentage of the clusters of pixels (e.g., 10%), and the like, do not satisfy an intensity constraint because they have respective intensity levels below the threshold intensity level.

A set of the clusters of pixels is determined based on the comparing (block 1108). In one example, cluster module 250 determines a set of the clusters of pixels based on the comparing.

A respective handle location of the object is determined for each cluster of the set of clusters based on a centroid of said each cluster of the set of clusters (block 1110). In one example, handle module 252 determines a respective handle location of the object for each cluster of the set of clusters based on a centroid of said each cluster of the set of clusters.

The procedures described herein constitute an improvement over procedures that require adjustment of basis points of vector graphics to deform artwork of an image, or require manual placement of handles and handle locations on the artwork to deform the artwork, such as when generating an animation sequence. By using a neural network trained to translate input images (e.g., rasterized greyscale images) to output images that include clusters of pixels having intensities greater than a uniform background and that indicate candidate handle locations, handle locations are reliably and quickly determined by the systems described herein. Hence, a user's time needed to deform an artwork (e.g., to generate an animation sequence), and the associated user-frustration in doing so, are significantly reduced compared to procedures that require adjustment of basis points of vector graphics or manual placement of handle locations on the artwork. Furthermore, by receiving user selections for desired densities of handles and threshold intensity levels, a user can control the number of handles and handle locations determined for artwork of an image by the systems described herein, and therefore does not need to waste time adding or removing handles, as may be required by other procedures that require manual placement of handles on artwork of an image.

Having considered example procedures in accordance with one or more implementations, consider now example systems and devices that can be utilized to practice the inventive principles described herein.

Example Systems and Devices

FIG. 12 illustrates an example system generally at 1200 that includes an example computing device 1202 that is representative of one or more computing systems and devices that may implement the various techniques described herein. This is illustrated through inclusion of image handle system 208, system 600, system 700, system 800, image handle application 242, and image handle support system 218, which operate as described above. Computing device 1202 may be, for example, a user computing device (e.g., one of computing devices 204), or a server device of a service provider, (e.g., server 216). Furthermore, computing device 1202 may include an on-chip system, multiple computing devices, combinations thereof, or any other suitable computing device or computing system. Accordingly, FIG. 12 illustrates computing device 1202 as one or more of a tablet, a laptop computer, a smart phone, smart eye glasses, and a camera, though these examples are illustrative and in no way are meant to limit the type or number of devices included in computing device 1202.

The example computing device 1202 includes a processing system 1204, one or more computer-readable media 1206, and one or more I/O interfaces 1208 that are communicatively coupled to each other. Although not shown, computing device 1202 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1204 is representative of functionality to perform one or more operations using hardware. Accordingly, processing system 1204 is illustrated as including hardware elements 1210 that may be configured as processors, functional blocks, and so forth. This may include implementation in hardware as an application specific integrated circuit or other logic device formed using one or more semiconductors. Hardware elements 1210 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 224 in FIG. 2 are an example of processing system 1204.

Computer-readable storage media 1206 is illustrated as including memory/storage 1212. Storage 226 in FIG. 2 is an example of memory/storage included in memory/storage 1212. Memory/storage component 1212 may include volatile media (such as random access memory (RAM)), non-volatile media (such as read only memory (ROM), Flash memory, optical disks, magnetic disks, and so forth), or combinations thereof. Memory/storage component 1212 may include fixed media (e.g., RAM, ROM, a fixed hard drive, and so on) as well as removable media (e.g., Flash memory, a removable hard drive, an optical disc, and so forth). Computer-readable media 1206 may be configured in a variety of other ways as further described below.

Input/output interface(s) 1208 are representative of functionality to allow a user to enter commands and information to computing device 1202, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1202 may be configured in a variety of ways as further described below to support user interaction.

Computing device 1202 also includes applications 1214. Applications 1214 are representative of any suitable applications capable of running on computing device 1202, and may include a web browser which is operable to access various kinds of web-based resources (e.g., assets, media clips, images, content, configuration files, services, user profiles, and the like). Applications 1214 include image handle application 242, as previously described. Furthermore, applications 1214 includes any applications supporting image handle system 208, system 600, system 700, system 800, and image handle support system 218.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1202. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1210, or combinations thereof. Computing device 1202 may be configured to implement particular instructions and functions corresponding to the software and hardware modules. Accordingly, implementation of a module that is executable by computing device 1202 as software may be achieved at least partially in hardware, e.g., through use of computer-readable storage media and hardware elements 1210 of processing system 1204. The instructions and functions may be executable/operable by one or more articles of manufacture (for example, one or more computing devices 1202 or processing systems 1204) to implement techniques, modules, and examples described herein.

The techniques described herein may be supported by various configurations of computing device 1202 and are not limited to the specific examples of the techniques described herein. This functionality may also be implemented all or in part through use of a distributed system, such as over a "cloud" 1216 via a platform 1218 as described below.

Cloud 1216 includes and is representative of a platform 1218 for resources 1220. Platform 1218 abstracts underlying functionality of hardware (e.g., servers) and software resources of cloud 1216. Resources 1220 may include applications, data, or applications and data that can be utilized while computer processing is executed on servers that are remote from computing device 1202. Resources 1220 can also include services provided over the Internet, through a subscriber network, such as a cellular or Wi-Fi network, or combinations thereof. Resources 1220 can include asset store 1222, which stores assets, such as images, photographs (e.g., user images in a gallery, a database of stock photographs, and the like), document templates, user profile data, user image libraries, photographs posted in a shared photo service, metadata of assets, and the like, and may be accessed by computing device 1202.

Platform 1218 may abstract resources and functions to connect computing device 1202 with other computing devices. Platform 1218 may also serve to abstract scaling of resources to provide a corresponding level of scale to encountered demand for resources 1220 that are implemented via platform 1218. Accordingly, in an interconnected device embodiment, implementation of functionality described herein may be distributed throughout system 1200. For example, the functionality may be implemented in part on computing device 1202 as well as via platform 1218 that abstracts the functionality of cloud 1216.

CONCLUSION

In one or more implementations, a digital medium environment includes at least one computing device. Systems and techniques are described herein for determining image handle locations. An image, such as a rasterized image in greyscale, is provided to a neural network as input, and the neural network translates the input image to an output image that includes clusters of pixels against a background that have intensities greater than an intensity of the background and that indicate candidate handle locations. Intensities of clusters of pixels in an output image are compared to a threshold intensity level to determine a set of the clusters of pixels satisfying an intensity constraint. The threshold intensity level can be user-selectable, so that a user can control a density of handles. A handle location for each cluster of the set of clusters is determined from a centroid (e.g., a center of mass) of each cluster. Handle locations include a coordinate for a respective handle location, such as an x-y coordinate that identifies a location on an object in an image and an attribute classifying a degree of freedom for a handle at a handle location.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to edit images, a method implemented by a computing device, the method comprising:
obtaining a representation of an image of an object;
generating an output image by applying the representation of the image to a neural network, the output image including clusters of pixels against a uniform background, the clusters of pixels indicating candidate handle locations for the object;
determining a set of the clusters of pixels having a respective intensity level above a threshold intensity level; and
determining a respective handle location of the object for each cluster of the set of clusters from the candidate handle locations based on a respective centroid of said each cluster.

2. The method as described in claim 1, wherein the representation of the image applied to the neural network includes vector graphics of the object.

3. The method as described in claim 1, wherein the threshold intensity level is a user-specified threshold intensity level and controls a number of handle locations that are determined for the object.

4. The method as described in claim 1, further comprising:
receiving a user-selection indicating a desired density of handle locations to be determined for the object; and
selecting the neural network from a plurality of available neural networks based on the desired density of handle locations indicated by the user-selection.

5. The method as described in claim 1, wherein the respective handle location of the object includes a coordinate for the respective handle location and an attribute classifying a degree of freedom for the respective handle location, the attribute including one of rigid, flexible, and anchor.

6. The method as described in claim 1, wherein the neural network is trained with a loss function including a pixel loss term, an adversarial loss term, and a perceptual loss term.

7. The method as described in claim 1, further comprising determining the respective centroid of said each cluster as a weighted center-of-mass with weights assigned to the pixels in proportion to intensities of the pixels.

8. The method as described in claim 1, further comprising determining an additional set of the clusters of pixels that do not have a respective intensity above the threshold intensity level, wherein the determining the set of the clusters of pixels includes excluding the additional set of the clusters of pixels from the set of the clusters of pixels.

9. In a digital medium environment to edit images, a system implemented by a computing device, the system including modules implemented at least partially in hardware of the computing device, the system comprising:
an image module to obtain an image of an object;
a user interface module to receive a user-selection indicating a density of handles for the object;
a neural network module to:
determine, based on the user-selection, a neural network from a plurality of neural networks corresponding to different densities of the handles; and
generate an output image by applying the image to the neural network, the output image including clusters of pixels against a uniform background, the clusters of pixels indicating candidate handle locations for the object;
a cluster module to determine a set of the clusters of pixels having a respective intensity level above a threshold intensity level; and
a handle module to determine a respective handle location of the object for each cluster of the set of clusters from the candidate handle locations.

10. The system as described in claim 9, wherein the handle module is implemented to determine the respective handle location of the object including a coordinate for the respective handle location and an attribute indicating a degree of freedom of a respective handle at the respective handle location, and the user interface module is implemented to display each said respective handle at the coordinate on the image for each said respective handle location with a respective designator indicating the attribute.

11. The system as described in claim 10, wherein the neural network is implemented to generate the clusters of pixels for the handles having a same degree of freedom on a same channel of the neural network.

12. The system as described in claim 9, wherein the user interface module is implemented to determine the density of handles for the object indicated by the user-selection as one of coarse, medium, and fine.

13. The system as described in claim 9, wherein the handle module is implemented to determine the respective handle location of the object for said each cluster of the set of clusters based on a center-of-mass of said each cluster.

14. The system as described in claim 9, wherein the neural network module is implemented to train the neural network with input images having user-specified handle locations and output images generated by convolving Gaussian filters with white patches at the user-specified handle locations on a black background.

15. The system as described in claim 14, wherein the neural network module is further implemented to train the neural network with a respective alpha mask distinguishing a respective object of said each of the input images from a respective background of said each of the input images.

16. The system as described in claim 9, wherein the cluster module is implemented to select an intensity level of a respective one pixel of said each cluster, and set the respective intensity level of said each cluster as the intensity level of the respective one pixel of said each cluster.

17. In a digital medium environment to edit images, a method implemented by a computing device, the method comprising:
a step for obtaining an image of an object;
a step for generating an output image by applying the image to a neural network, the output image including a background and clusters of pixels having intensities greater than an intensity of the background, the clusters of pixels indicating candidate handle locations for the object;
a step for comparing a respective intensity level of each cluster of the clusters of pixels to a threshold intensity level;
a step for determining a set of the clusters of pixels based on the comparing; and
a step for determining a respective handle location of the object for each cluster of the set of clusters from the candidate handle locations based on a centroid of said each cluster of the set of clusters.

18. The method as described in claim 17, wherein the threshold intensity level is determined based on a number of the clusters of pixels in the output image.

19. The method as described in claim 17, wherein the threshold intensity level is determined based on the intensities of the clusters of pixels in the output image.

20. The method as described in claim 17, further comprising, for said each cluster of the set of clusters:
   determining a circle that includes a specified percentage of the pixels of the cluster;
   determining a set of the pixels of the cluster that are within a threshold distance of a center of the circle; and
   determining the centroid for the cluster from the set of pixels of the cluster and not from additional pixels of the cluster that are not within the threshold distance of the center of the circle.

\* \* \* \* \*